United States Patent
Lin et al.

(10) Patent No.: US 11,688,086 B2
(45) Date of Patent: Jun. 27, 2023

(54) THREE-DIMENSIONAL MODELING USING HEMISPHERICAL OR SPHERICAL VISIBLE LIGHT-DEPTH IMAGES

(71) Applicant: GUANGDONG OPPO MOBILE TELECOMMUNICATIONS CORP., LTD., Guangdong (CN)

(72) Inventors: Yuan Lin, Palo Alto, CA (US); Fan Deng, Palo Alto, CA (US); Chiuman Ho, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 177 days.

(21) Appl. No.: 17/463,959

(22) Filed: Sep. 1, 2021

(65) Prior Publication Data
US 2021/0398303 A1 Dec. 23, 2021

Related U.S. Application Data

(63) Continuation of application No. PCT/CN2019/104578, filed on Sep. 5, 2019.
(Continued)

(51) Int. Cl.
*G06K 9/00* (2022.01)
*G06T 7/521* (2017.01)
(Continued)

(52) U.S. Cl.
CPC .............. *G06T 7/521* (2017.01); *G06T 7/536* (2017.01); *G06T 7/586* (2017.01)

(58) Field of Classification Search
CPC ......... G06T 7/521; G06T 7/536; G06T 7/586; G01B 11/2513; G01S 7/4808; G01S 17/46; G01S 17/89; H04N 13/271; H04N 13/254
See application file for complete search history.

(56) References Cited

U.S. PATENT DOCUMENTS

6,313,467 B1 * 11/2001 Shafer ................ G02B 17/0808
250/461.1
7,176,960 B1 * 2/2007 Nayar ................... G06T 3/4038
348/207.99
(Continued)

FOREIGN PATENT DOCUMENTS

CN 102799318 11/2012
CN 103081484 5/2013
(Continued)

OTHER PUBLICATIONS

CNIPA, First Office Action for CN Application No. 201980091640.9, dated Jul. 8, 2022.
(Continued)

*Primary Examiner* — Shervin K Nakhjavan
(74) *Attorney, Agent, or Firm* — Hodgson Russ LLP

(57) ABSTRACT

Three-dimensional modeling includes obtaining a hemispherical or spherical visible light-depth image capturing an operational environment of a user device, generating a perspective converted hemispherical or spherical visible light-depth image, generating a three-dimensional model of the operational environment based on the perspective converted hemispherical or spherical visible light-depth image, and outputting the three-dimensional model. Obtaining the hemispherical or spherical visible light-depth image includes obtaining a hemispherical or spherical visual light image and obtaining a hemispherical or spherical non-visual light depth image. Generating the perspective converted hemispherical or spherical visible light-depth image includes generating a perspective converted hemispherical or spherical visual light image and generating a perspective converted hemispherical or spherical non-visual light depth image.

20 Claims, 13 Drawing Sheets

Related U.S. Application Data

(60) Provisional application No. 62/824,635, filed on Mar. 27, 2019.

(51) Int. Cl.
  *G06T 7/586* (2017.01)
  *G06T 7/536* (2017.01)

(56) References Cited

U.S. PATENT DOCUMENTS

| | | | |
|---|---|---|---|
| 10,341,559 B2* | 7/2019 | Niazi | G02B 9/34 |
| 10,510,111 B2* | 12/2019 | Eraker | G06T 11/60 |
| 11,462,940 B2* | 10/2022 | Urbach | G06F 1/163 |
| 2013/0107005 A1 | 5/2013 | Lim et al. | |
| 2015/0261184 A1 | 9/2015 | Mannion et al. | |
| 2016/0261854 A1* | 9/2016 | Ryu | H04N 13/254 |
| 2016/0295197 A1 | 10/2016 | Hudman et al. | |
| 2016/0357146 A1 | 12/2016 | Brooker et al. | |
| 2017/0131403 A1* | 5/2017 | Lin | G01S 17/08 |
| 2019/0098276 A1* | 3/2019 | Duggan | H04N 23/698 |
| 2019/0208181 A1* | 7/2019 | Rowell | H04N 9/8715 |
| 2020/0186782 A1* | 6/2020 | Bigioi | H04N 23/698 |
| 2021/0358150 A1* | 11/2021 | Lin | G01S 17/894 |
| 2021/0368156 A1* | 11/2021 | Lin | G01S 17/89 |

FOREIGN PATENT DOCUMENTS

| | | |
|---|---|---|
| CN | 105242384 | 1/2016 |
| CN | 105939440 | 9/2016 |
| CN | 106679616 | 5/2017 |
| CN | 107439002 | 12/2017 |

OTHER PUBLICATIONS

WIPO, International Search Report and Written Opinion for PCT/CN2019/104578, dated Jan. 2, 2020.

Mur-Artal et al., "ORB-SLAM2: An Open-Source SLAM System for Monocular, Stereo, and RGB-D Cameras," IEEE Transactions on Robotics, 2017, vol. 33, No. 5.

Zollhofer et al., "State of the Art on 3D Reconstruction with RGB-D Cameras," Eurographics, 2018, vol. 37, No. 2.

EPO, Extended European Search Report for EP Application No. 19920725.9, dated Feb. 4, 2022.

* cited by examiner

THREE-DIMENSIONAL MODELING USING HEMISPHERICAL OR SPHERICAL VISIBLE LIGHT-DEPTH IMAGES

CROSS-REFERENCE TO RELATED APPLICATION

This application is a continuation of International Application No. PCT/CN2019/104578, filed on Sep. 5, 2019, which claims priority to U.S. Provisional Application No. 62/824,635, filed on Mar. 27, 2019, the entire disclosures of which are incorporated herein by reference.

TECHNICAL FIELD

This disclosure relates to three-dimensional (3D) modeling, such as using hemispherical or spherical visible light-depth images, in a user device.

BACKGROUND

Cameras may be used for capturing images or video, object detection and tracking, facial recognition, and the like. Accordingly, a method and apparatus for three-dimensional modeling using hemispherical or spherical visible light-depth images may be advantageous.

SUMMARY

Disclosed herein are implementations of three-dimensional modeling using hemispherical or spherical visible light-depth images.

An aspect disclosed herein is a method of three-dimensional modeling using hemispherical or spherical visible light-depth images. Three-dimensional modeling using hemispherical or spherical visible light-depth images includes obtaining a hemispherical or spherical visible light-depth image capturing an operational environment of a user device. Obtaining the hemispherical or spherical visible light-depth image includes obtaining a hemispherical or spherical visual light image and obtaining a hemispherical or spherical non-visual light depth image. Three-dimensional modeling using hemispherical or spherical visible light-depth images includes generating a perspective converted hemispherical or spherical visible light-depth image. Generating the perspective converted hemispherical or spherical visible light-depth image includes generating a perspective converted hemispherical or spherical visual light image and generating a perspective converted hemispherical or spherical non-visual light depth image. Three-dimensional modeling using hemispherical or spherical visible light-depth images includes generating a three-dimensional model of the operational environment based on the perspective converted hemispherical or spherical visible light-depth image and outputting the three-dimensional model.

Another aspect disclosed herein is an apparatus for three-dimensional modeling using hemispherical or spherical visible light-depth images. The apparatus includes a hemispherical or spherical non-visible light projector, a hemispherical or spherical non-visible light sensor, a hemispherical or spherical visible light sensor, a non-transitory computer readable medium, and a processor configured to execute instructions stored on the non-transitory computer readable medium to obtain a hemispherical or spherical visible light-depth image capturing an operational environment of the apparatus. Obtaining the hemispherical or spherical visible light-depth image includes controlling the hemispherical or spherical visible light sensor to obtain a hemispherical or spherical visual light image, controlling the hemispherical or spherical non-visible light projector to project a hemispherical or spherical non-visible light static structured light pattern, in response to controlling the hemispherical or spherical non-visible light projector to project the hemispherical or spherical non-visible light static structured light pattern, controlling the hemispherical or spherical non-visible light sensor to obtain a hemispherical or spherical non-visual light depth image, and generate a perspective converted hemispherical or spherical visible light-depth image. Generating the perspective converted hemispherical or spherical visible light-depth image includes generating a perspective converted hemispherical or spherical visual light image and generating a perspective converted hemispherical or spherical non-visual light depth image. The processor configured to execute instructions stored on the non-transitory computer readable medium to generate a three-dimensional model of the operational environment based on the perspective converted hemispherical or spherical visible light-depth image and output the three-dimensional model.

Another aspect disclosed herein is a non-transitory computer-readable storage medium, comprising executable instructions that, when executed by a processor, facilitate performance of three-dimensional modeling using hemispherical or spherical visible light-depth images, which includes obtaining a hemispherical or spherical visible light-depth image capturing an operational environment of a user device. Obtaining the hemispherical or spherical visible light-depth image includes obtaining a hemispherical or spherical visual light image and obtaining a hemispherical or spherical non-visual light depth image. Three-dimensional modeling using hemispherical or spherical visible light-depth images includes generating a perspective converted hemispherical or spherical visible light-depth image. Generating the perspective converted hemispherical or spherical visible light-depth image includes generating a perspective converted hemispherical or spherical visual light image and generating a perspective converted hemispherical or spherical non-visual light depth image. Three-dimensional modeling using hemispherical or spherical visible light-depth images includes generating a three-dimensional model of the operational environment based on the perspective converted hemispherical or spherical visible light-depth image and outputting the three-dimensional model.

It should be noted that for three-dimensional modeling using hemispherical visible light-depth images, expressions such as visible light-depth image, visual light image, non-visual light depth image, perspective converted visible light-depth image, perspective converted visible light-depth image, perspective converted visual light image, perspective converted non-visual light depth image, projected non-visible light and the like are all hemispherical; for three-dimensional modeling using spherical visible light-depth images, expressions such as visible light-depth image, visual light image, non-visual light depth image, perspective converted visible light-depth image, perspective converted visible light-depth image, perspective converted visual light image, perspective converted non-visual light depth image, projected non-visible light and the like are all spherical.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
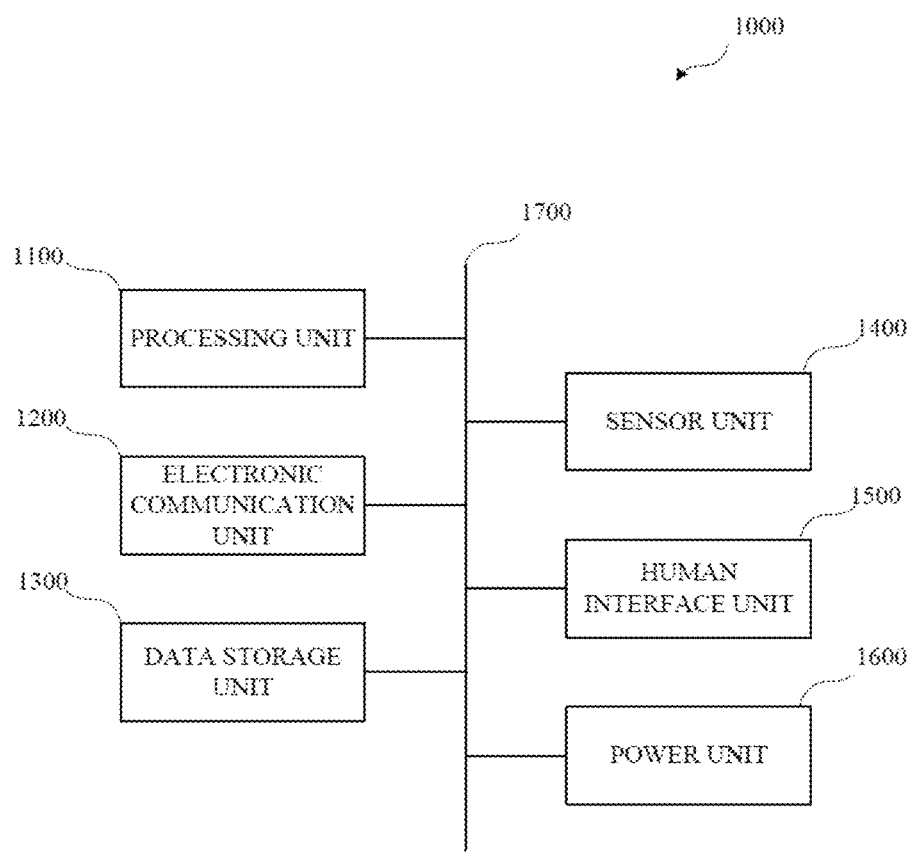
FIG. 1 shows an example of a user device for digital computing and electronic communication in accordance with this disclosure.

Light sensors, such as cameras, may be used for a variety of purposes, including capturing images or video, object detection and tracking, facial recognition, and the like. Wide angle, or ultrawide-angle lenses, such as fisheye lenses, allow cameras to capture panoramic or hemispherical scenes. Dual fisheye lens cameras arranged in opposite directions along an optical axis allow a camera device to capture spherical images.

In some systems, visible light sensors, such as cameras, are used to determine depth information corresponding to a distance between the camera apparatus and respective external objects in the captured scene. For example, some cameras implement stereovision, or binocular, depth detection, wherein multiple overlapping images captured by multiple, spatially separate, cameras are evaluated to determine depth based on disparities between the content captured by the images. The resource costs, including multiple cameras and computational costs, may be high and the accuracy of binocular depth detection may be limited. The three-dimensional depth detection capabilities of cameras may be limited based on the respective field of view.

Spherical or hemispherical non-visible light depth detection may improve the accuracy and efficiency of non-hemispherical depth detection and visible light depth detection, by projecting a non-visible light, such as infrared, spherical or hemispherical static dot cloud pattern, detecting reflected non-visible light using a spherical or hemispherical non-visible light detector, and determining three-dimensional depth based on a function of the received light corresponding to the projected static dot cloud pattern.

Three-dimensional maps or models representing the operational environment of the user device may be used, for example, for augmented reality or virtual reality implementations. Generating three-dimensional maps or models generated using images captured by a camera having a limited, such as rectilinear or otherwise less than hemispherical, field of view may be inefficient and inaccurate. For example, generating a three-dimensional map or model using images captured by a camera having a limited, such as rectilinear or otherwise less than hemispherical, field of view may include using multiple image capture units, or positioning, such as manually, an image capture unit in a sequence of positions over time, to generate multiple images, and merging the multiple images to inefficiently and inaccurately generate the model.

Three-dimensional modeling using hemispherical or spherical visible light-depth images, which may include fisheye depth detection, may improve the efficiency, speed, and accuracy of three-dimensional modeling relative to three-dimensional modeling based on limited, such as rectilinear or otherwise less than hemispherical, images. Three-dimensional modeling using hemispherical or spherical visible light-depth images may use fewer images and may include fewer image stitching operations. Three-dimensional modeling using hemispherical or spherical visible light-depth images may increase the availability of feature information per image.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

FIG. 1 shows an example of a user device for digital computing and electronic communication 1000 in accordance with this disclosure. The user device for digital computing and electronic communication 1000 includes an electronic processing unit 1100, an electronic communication interface unit 1200, a data storage unit 1300, a sensor unit 1400, a human interface unit 1500, a power unit 1600, and an internal signal distribution unit 1700. The user device for digital computing and electronic communication 1000 may implement one or more aspects or elements of the methods and systems described herein. In some embodiments, the user device for digital computing and electronic communication 1000 may include other components not shown in FIG. 1. For example, the user device for digital computing and electronic communication 1000 may include a housing or enclosure, and the electronic processing unit 1100, the electronic communication interface unit 1200, the data storage unit 1300, the sensor unit 1400, the human interface unit 1500, the power unit 1600, the internal signal distribution unit 1700, or a combination thereof, may be included in the housing.

Although FIG. 1 shows each of the electronic processing unit 1100, the electronic communication interface unit 1200, the data storage unit 1300, the sensor unit 1400, the human interface unit 1500, the power unit 1600, and the internal signal distribution unit 1700 as respective individual units, the user device for digital computing and electronic communication 1000 may include any number of electronic processing units, electronic communication interface units, data storage units, sensor units, human interface units, power units, and internal signal distribution units.

The electronic processing unit 1100, or processor, is operable to receive data, process, and output data. For example, the electronic processing unit 1100 may receive data from the data storage unit 1300, the sensor unit 1400, the electronic communication interface unit 1200, the human interface unit 1500, or a combination thereof. Receiving data may include receiving computer instructions, such as computer instructions stored in the data storage unit 1300 via the internal signal distribution unit 1700. Processing data may include processing or executing computer instructions, such as to implement or perform one or more elements or aspects of the techniques disclosed herein. The electronic processing unit may output data to the data storage unit 1300, the sensor unit 1400, the electronic communication interface unit 1200, the human interface unit 1500, or a combination thereof, via the via the internal signal distribution unit 1700. The electronic processing unit 1100 may be operable to control one or more operations of the user device for digital computing and electronic communication 1000.

The electronic communication interface unit 1200 may communicate, such as receive, transmit, or both, signals, such as data signals, with external devices or systems using wired or wireless electronic communication protocols, such as a near-field communication (NFC) electronic communication protocol, a Bluetooth electronic communication protocol, an 802.11 electronic communication protocol, an infrared (IR) electronic communication protocol, or any other electronic communication protocol.

The data storage unit 1300 may store data, retrieve data, or both. For example, the data storage unit 1300 may retrieve computer instructions and other data. The data storage unit 1300 may include persistent memory, such as a hard-drive. The data storage unit 1300 may include volatile memory, such as one or more random-access memory units.

The sensor unit 1400 may capture, detect, or determine one or more aspects of the operational environment of the user device for digital computing and electronic communication 1000. For example, the sensor unit 1400 may include one or more cameras, or other visible or non-visible light detection and capture units. The sensor unit 1400 may communicate sensor signals, such as captured image data, representing the sensed aspects of the operational environment of the user device for digital computing and electronic communication 1000 to the internal signal distribution unit 1700, the power unit 1600, the data storage unit 1300, the electronic processing unit 1100, the electronic communication interface unit 1200, the human interface unit 1500, or a combination thereof. In some embodiments, the user device for digital computing and electronic communication 1000 may include multiple sensor units, such as a camera, a microphone, an infrared receiver, a global positioning system unit, a gyroscopic sensor, an accelerometer, a pressure sensor, a capacitive sensor, a biometric sensor, a magnetometer, a radar unit, a lidar unit, an ultrasound unit, a temperature sensor, or any other sensor capable of capturing, detecting, or determining one or more aspects or conditions of the operational environment of the user device for digital computing and electronic communication 1000.

The human interface unit 1500 may receive user input. The human interface unit 1500 may communicate data representing the user input to the internal signal distribution unit 1700, the power unit 1600, the data storage unit 1300, the electronic processing unit 1100, the sensor unit 1400, the electronic communication interface unit 1200, or a combination thereof. The human interface unit 1500, may output, present, or display data, or representations thereof, such as to a user of the user device for digital computing and electronic communication 1000. For example, the human interface unit 1500 may include a light-based display, a sound-based display, or a combination thereof.

The power unit 1600 may supply power to the internal signal distribution unit 1700, the data storage unit 1300, the electronic processing unit 1100, the sensor unit 1400, the electronic communication interface unit 1200, and the human interface unit 1500, such as via the internal signal distribution unit 1700 or via an internal power signal distribution unit (not separately shown). For example, the power unit 1600 may be a battery. In some embodiments, the power unit 1600 may include an interface with an external power source.

The internal signal distribution unit 1700 may carry or distribute internal data signals, power signals, or both, such as to the electronic processing unit 1100, the electronic communication interface unit 1200, the data storage unit 1300, the sensor unit 1400, the human interface unit 1500, the power unit 1600, or a combination thereof.

Other implementations of configurations of the user device for digital computing and electronic communication 1000 may be used. For example, the user device for digital computing and electronic communication 1000 may omit the electronic communication interface unit 1200.

Figure 2:
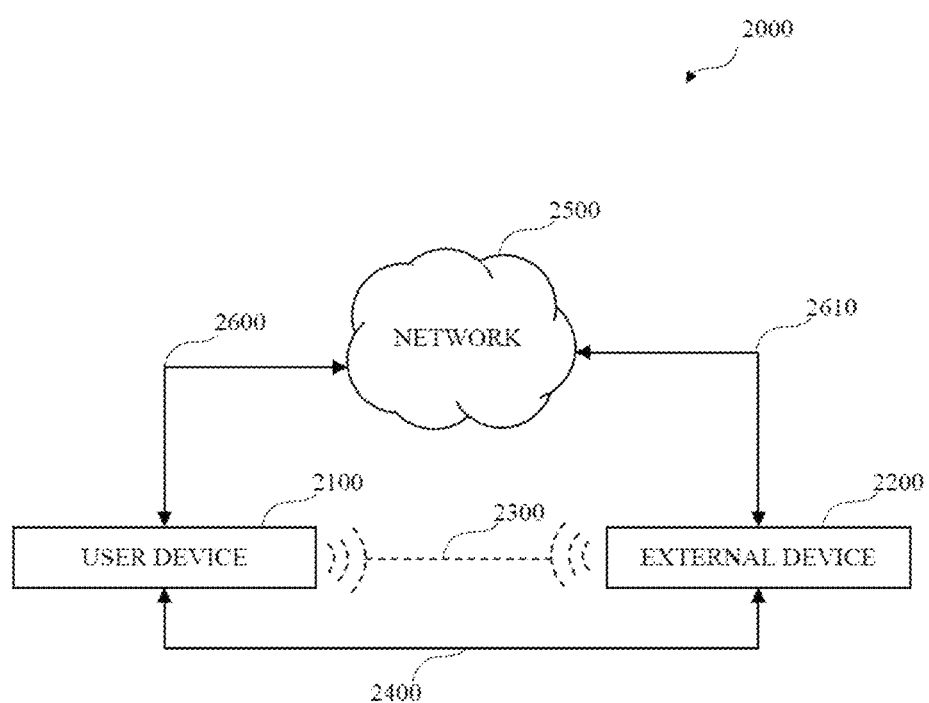
FIG. 2 shows a block diagram of a system for fisheye non-visible light depth detection in accordance with this disclosure.

FIG. 2 shows a block diagram of a system for fisheye non-visible light depth detection 2000 in accordance with this disclosure. As shown, the system for fisheye non-visible light depth detection 2000 includes a user device 2100, such as the user device for digital computing and electronic communication 1000 shown in FIG. 1. In FIG. 2, the user device 2100 is shown in electronic communication with an external device 2200, as indicated by the broken lines at 2300. The external device 2200 may be similar to the user device for digital computing and electronic communication 1000 shown in FIG. 1, except as described herein or otherwise clear from context. In some embodiments, the external device 2200 may be a server or other infrastructure device.

The user device 2100 may communicate with the external device 2200 directly via a wired or wireless electronic communication medium 2400. The user device 2100 may communicate with the external device 2200 directly via a network 2500, such as the Internet, or via a combination networks (not separately shown). For example, the user device 2100 may communicate via the network 2500 using a first network communication link 2600 and the external device may communicate via the network 2500 using a second network communication link 2610.

Figure 3:
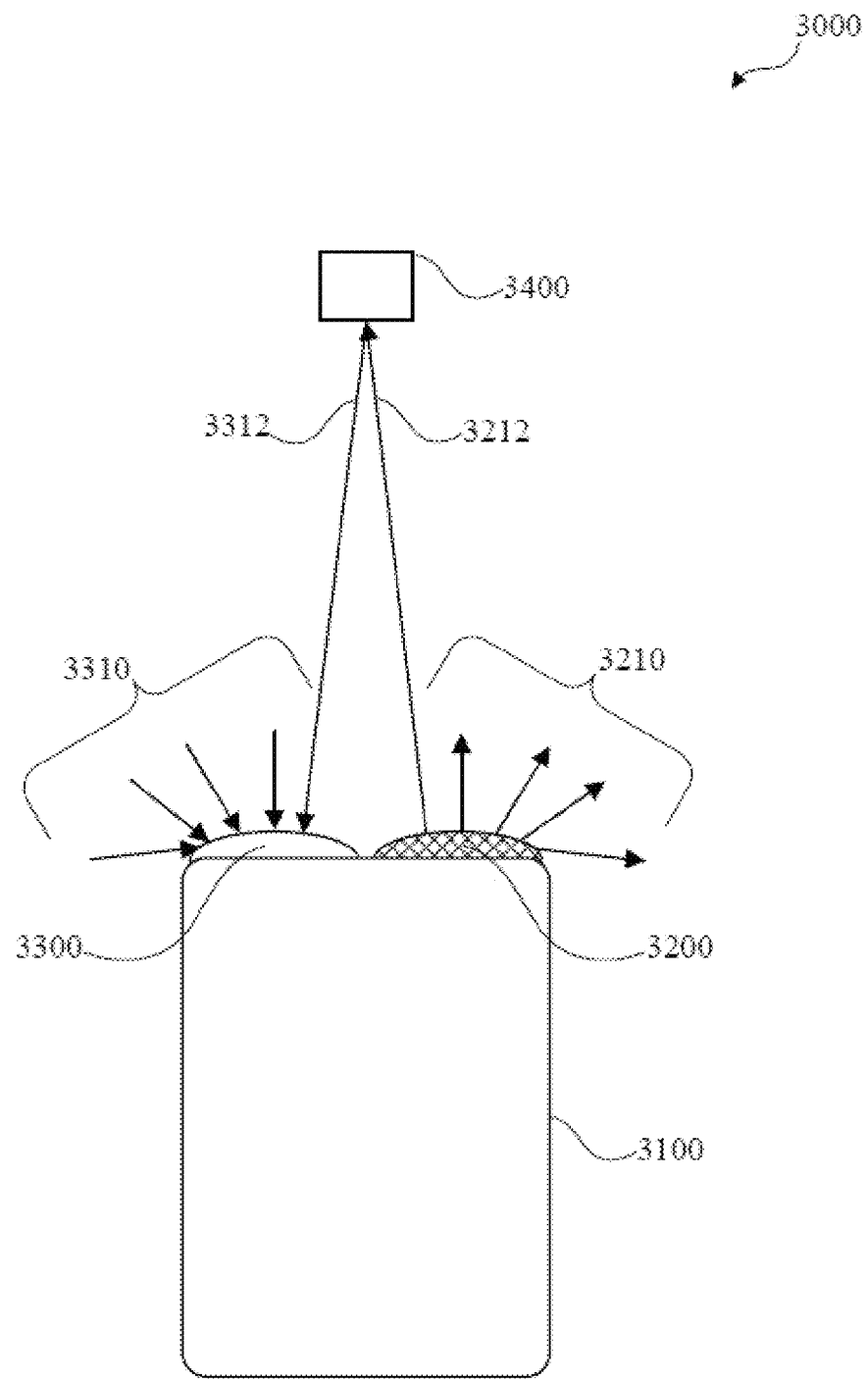
FIG. 3 shows a diagram of an example of a hemispherical fisheye non-visible light depth detection device in accordance with this disclosure.

FIG. 3 shows a diagram of an example of a hemispherical fisheye non-visible light depth detection device 3000 in accordance with this disclosure. The hemispherical fisheye non-visible light depth detection device 3000, or fisheye depth camera, may be similar to a user device, such as the user device for digital computing and electronic communication 1000 shown in FIG. 1, except as described herein or otherwise clear from context. The hemispherical fisheye non-visible light depth detection device 3000 may be a fisheye camera, which is an ultra-wide-angle camera, and which may capture panoramic or hemispherical images. The hemispherical fisheye non-visible light depth detection device 3000 may be a depth camera, which may capture or determine depth information of a captured scene.

The hemispherical fisheye non-visible light depth detection device 3000 includes a device housing 3100, a hemispherical fisheye non-visible light projection unit 3200, and a fisheye non-visible light detection unit 3300.

Figure 5:
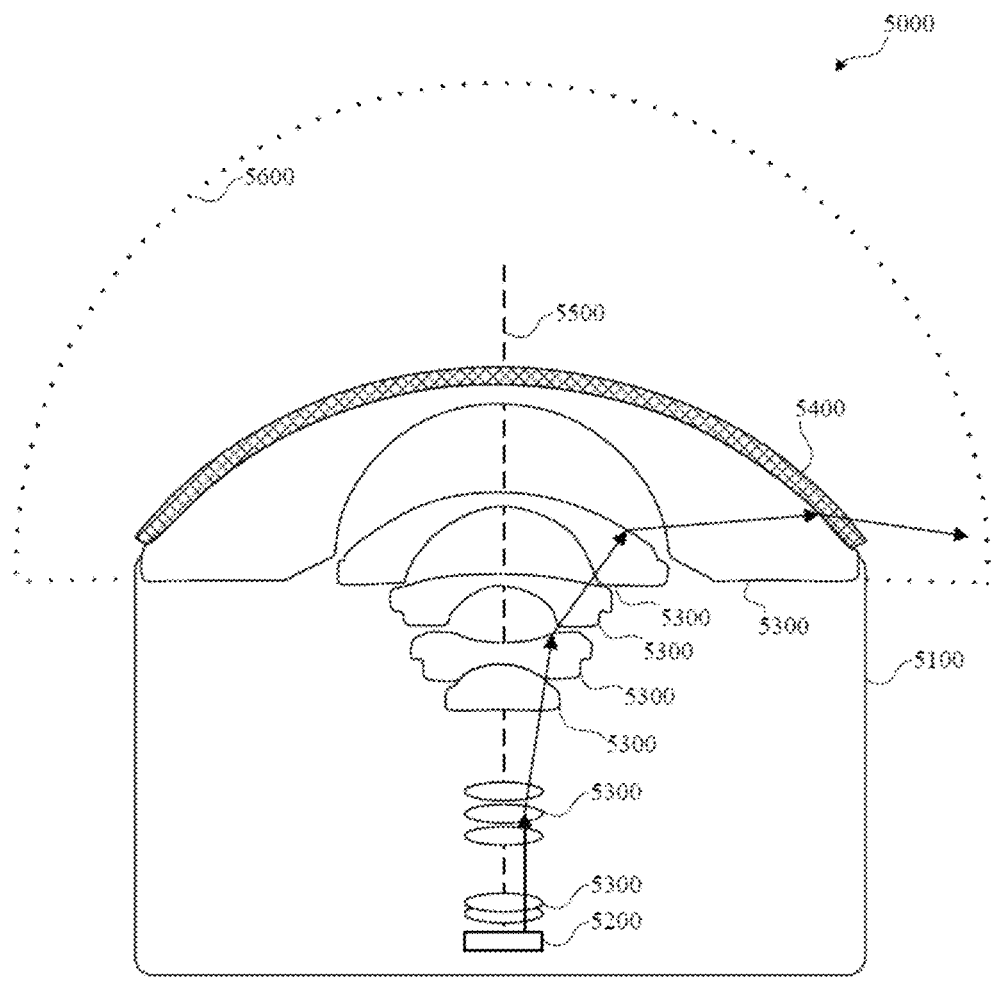
FIG. 5 shows a diagram of an example of a hemispherical fisheye non-visible light projection unit in accordance with this disclosure.

The hemispherical fisheye non-visible light projection unit 3200 may be a fisheye infrared dot projector. The hemispherical fisheye non-visible light projection unit 3200 may project or emit non-visible light, such as infrared light, in a point pattern, such as a static dot cloud pattern, as indicated by the directional lines 3210 extending from the surface of the hemispherical fisheye non-visible light projection unit 3200. Although five directional lines 3210 are shown extending from the surface of the hemispherical fisheye non-visible light projection unit 3200 for simplicity and clarity, the non-visible light static dot cloud pattern projected by the hemispherical fisheye non-visible light projection unit 3200 may have a field of projection of 360 degrees longitudinally and 180 degrees, or greater, laterally, such as 183 degrees. An example of the hemispherical fisheye non-visible light projection unit 3200 is shown in FIG. 5. In some embodiments, such as panoramic embodiments, the longitudinal field may be less than 360 degrees.

Figure 6:
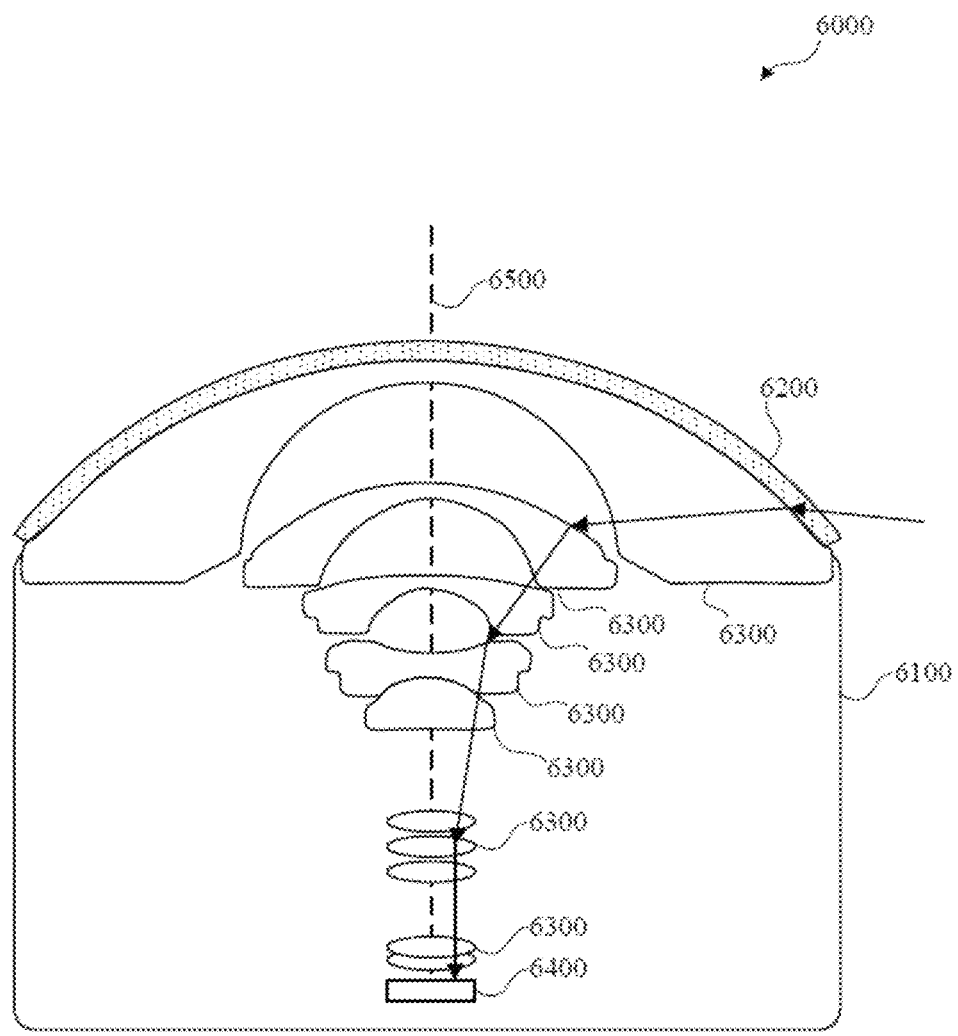
FIG. 6 shows a diagram of an example of a hemispherical fisheye non-visible light detection unit in accordance with this disclosure.

The fisheye non-visible light detection unit 3300 may be a fisheye infrared camera. The fisheye non-visible light detection unit 3300 may detect or receive non-visible light, such as infrared light as indicated by the directional lines 3310 converging on the surface of the fisheye non-visible light detection unit 3300. For example, the fisheye non-visible light detection unit 3300 may receive non-visible light emitted by the hemispherical fisheye non-visible light projection unit 3200 in the static dot cloud pattern and reflected to the fisheye non-visible light detection unit 3300 by aspects the environment, such as objects in the field of view of the fisheye non-visible light detection unit 3300. Although five directional lines 3210 are shown converging on the surface of the fisheye non-visible light detection unit 3300 for simplicity and clarity, the fisheye non-visible light detection unit 3300 may have a field of view of 360 degrees longitudinally and 180 degrees, or greater, laterally, such as 183 degrees. An example of the fisheye non-visible light detection unit 3300 is shown in FIG. 6.

The hemispherical fisheye non-visible light depth detection device 3000 may perform fisheye non-visible light depth detection by emitting non-visible light in a static dot cloud pattern using the hemispherical fisheye non-visible light projection unit 3200 and detecting corresponding reflected non-visible light using the fisheye non-visible light detection unit 3300 (detected reflected non-visible light).

For example, FIG. 3 show an external object 3400 in the environment of the hemispherical fisheye non-visible light depth detection device 3000, such as in the field of projection of the hemispherical fisheye non-visible light projection unit 3200 and the field of view of the fisheye non-visible light detection unit 3300. Non-visible light may be emitted by the hemispherical fisheye non-visible light projection unit 3200 toward the external object 3400 as indicated by the directional line at 3212. The non-visible light may be reflected by a surface of the external object 3400 toward the fisheye non-visible light detection unit 3300 as indicated by the directional line at 3312 and may be captured or recorded by the fisheye non-visible light detection unit 3300.

Figure 4:
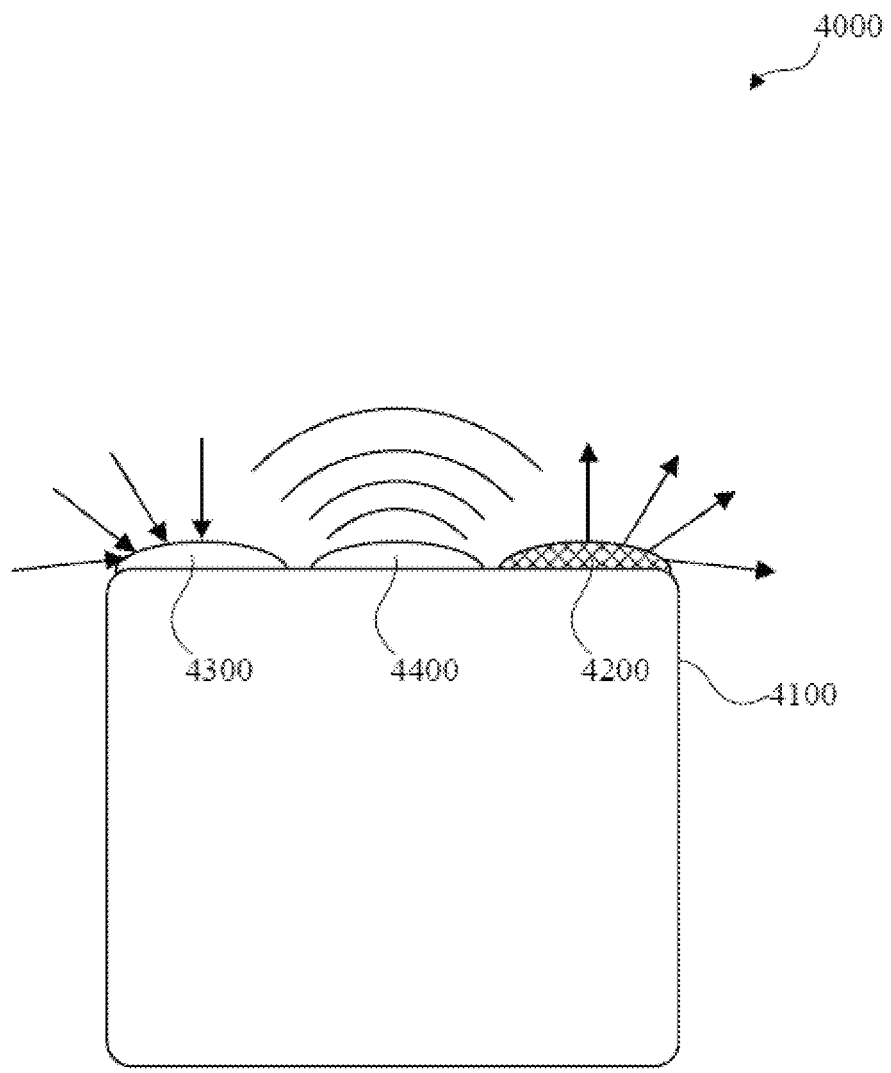
FIG. 4 shows a diagram of another example of a hemispherical fisheye non-visible light depth detection device in accordance with this disclosure.

FIG. 4 shows a diagram of another example of a hemispherical fisheye non-visible light depth detection device 4000 in accordance with this disclosure. The hemispherical fisheye non-visible light depth detection device 4000 may be similar to the hemispherical fisheye non-visible light depth detection device 3000 shown in FIG. 3, except as described herein or otherwise clear from context.

The hemispherical fisheye non-visible light depth detection device 4000 includes a device housing 4100, a hemispherical fisheye non-visible light projection unit 4200, a hemispherical fisheye non-visible light detection unit 4300, and a hemispherical fisheye non-visible light flood projection unit 4400.

The device housing 4100 may be similar to the device housing 3100 shown in FIG. 3, except as described herein or otherwise clear from context. The hemispherical fisheye non-visible light projection unit 4200 may be similar to the hemispherical fisheye non-visible light projection unit 3200 shown in FIG. 3, except as described herein or otherwise clear from context. The hemispherical fisheye non-visible light detection unit 4300, may be similar to the fisheye non-visible light detection unit 3300 shown in FIG. 3, except as described herein or otherwise clear from context.

The hemispherical fisheye non-visible light flood projection unit 4400, or infrared flood illuminator, may be similar to the hemispherical fisheye non-visible light projection unit 3200 shown in FIG. 3, except as described herein or otherwise clear from context. The hemispherical fisheye non-visible light flood projection unit 4400 may emit a diffuse, even, field of non-visible light, such as infrared light, as indicated by the arced lines extending from the surface of the hemispherical fisheye non-visible light flood projection unit 4400. The diffuse field of non-visible light emitted by the hemispherical fisheye non-visible light flood projection unit 4400 may non-visibly illuminate the environment of the hemispherical fisheye non-visible light depth detection device 4000, which may include illuminating external objects proximate to the hemispherical fisheye non-visible light depth detection device 4000.

The hemispherical fisheye non-visible light detection unit 4300 may receive non-visible light emitted by the hemispherical fisheye non-visible light flood projection unit 4400 and reflected by the external objects in the environment of the hemispherical fisheye non-visible light depth detection device 4000, such as for use in a liveness test portion of a facial recognition method or in a feature extraction portion of a simultaneous localization and mapping (SLAM) method. Depth detection based on received reflected non-visible light emitted from the hemispherical fisheye non-visible light flood projection unit 4400 may inaccurate, inefficient, or both.

FIG. 5 shows a diagram of an example of a hemispherical fisheye non-visible light projection unit 5000 in accordance with this disclosure. A fisheye non-visible light depth detection device, such as the hemispherical fisheye non-visible light depth detection device 3000 shown in FIG. 3, or the hemispherical fisheye non-visible light depth detection device 4000 shown in FIG. 4, may include the hemispherical fisheye non-visible light projection unit 5000. For example, the hemispherical fisheye non-visible light projection unit 3200 of the hemispherical fisheye non-visible light depth detection device 3000 shown in FIG. 3 may be implemented as the hemispherical fisheye non-visible light projection unit 5000.

The hemispherical fisheye non-visible light projection unit 5000 includes an enclosure 5100, a non-visible light source 5200, one or more lenses 5300, and a diffractive optical element (DOE) 5400. The hemispherical fisheye non-visible light projection unit 5000 has an optical axis, as indicated by the broken line at 5500.

The non-visible light source 5200 may be an infrared light source such as a vertical-cavity surface-emitting laser (VCSEL). The non-visible light generated by the non-visible light source 5200 is refracted by the lenses 5300 to form a field of projection of 360 degrees longitudinally and 180 degrees, or greater, laterally, such as 183 degrees. The non-visible light forming the field of projection is rectified to form static dot cloud pattern by the diffractive optical element 5400, as indicated by the dotted line arc at 5600. An indication of an example light path is indicated by the directional lines extending from the non-visible light source 5200 and passing through the lenses 5300 and passing through and extending from the diffractive optical element 5400. In some embodiments, the diffractive optical element 5400 may be omitted and the hemispherical fisheye non-visible light projection unit 5000 may include a dot cloud mask that may form the static dot cloud pattern from the non-visible light generated by the non-visible light source 5200 and refracted by the lenses 5300.

In an example, the non-visible light source 5200 may be an infrared light source that may generate infrared light (photons) having a defined wavelength, such as 940 nm. Infrared light having a 940 nm wavelength may be absorbed by water in the atmosphere and using infrared light having a 940 nm wavelength may improve performance and accuracy of fisheye non-visible light depth perception, such as in outdoor conditions. Other wavelengths, such as 850 nm, or another infrared or near-infrared wavelength, such as a wavelength in the range 0.75 µm to 1.4 µm, may be used. In this context, a defined wavelength of 940 nm may indicate light narrowly spread around 940 nm. The use of light at the defined wavelength of 940 nm may reduce resource costs and reduce the chromatic aberration relative visible light.

The non-visible light source 5200 generates the non-visible light in a plane and the combination of the lenses 5300 and the diffractive optical element 5400 maps the light emitted by non-visible light source 5200 to the spherically distributed static dot cloud pattern.

The number and configuration of the lenses 5300 shown in FIG. 5 is shown for simplicity and clarity. Other numbers and configurations of lenses may be used. The optical construction of the lenses 5300, such as the respective shapes, materials, or both, of these lenses 5300 is optimized according to the refractive index of the non-visible light generated by the non-visible light source 5200.

FIG. 6 shows a diagram of an example of a hemispherical fisheye non-visible light detection unit 6000 in accordance with this disclosure. A fisheye non-visible light depth detection device, such as the hemispherical fisheye non-visible light depth detection device 3000 shown in FIG. 3, or the hemispherical fisheye non-visible light depth detection device 4000 shown in FIG. 4, may include the hemispherical fisheye non-visible light detection unit 6000. For example, the fisheye non-visible light detection unit 3300 of the hemispherical fisheye non-visible light depth detection device 3000 shown in FIG. 3 may be implemented as the hemispherical fisheye non-visible light detection unit 6000.

The hemispherical fisheye non-visible light detection unit 6000 includes an enclosure 6100, a non-visible light pass filter 6200, one or more lenses 6300, and a non-visible light receiver 6400. The hemispherical fisheye non-visible light detection unit 6000 has an optical axis, as indicated by the broken line at 6500, and a field of view (not shown) of 360 degrees longitudinally and 180 degrees, or greater, laterally, centered on the optical axis 6500.

The non-visible light pass filter 6200 may receive light, which may include non-visible light, such as infrared light. For example, the non-visible light pass filter 6200 may receive infrared light from a static dot cloud pattern reflected by proximate external objects (not shown) subsequent to emission from a non-visible light projection unit, such as the hemispherical fisheye non-visible light projection unit 5000 shown in FIG. 5.

The light received by the non-visible light pass filter 6200 is filtered by the non-visible light pass filter 6200 to exclude visible light and pass through non-visible light. The non-visible light passed through the non-visible light pass filter 6200 is focused on the non-visible light receiver 6400 by the lenses 6300. The combination of the non-visible light pass filter 6200 and the lenses 6300 maps the hemispherical field of view of the hemispherical fisheye non-visible light detection unit 6000 to the plane of the non-visible light receiver 6400. The non-visible light receiver 6400 may be an infrared light receiver.

The number and configuration of the lenses 6300 shown in FIG. 6 is shown for simplicity and clarity. Other numbers and configurations of lenses may be used. The optical construction of the lenses 6300, such as the respective shapes, materials, or both, of these lenses 6300 is optimized according to the refractive index of the non-visible light received by the non-visible light receiver 6400.

Figure 7:
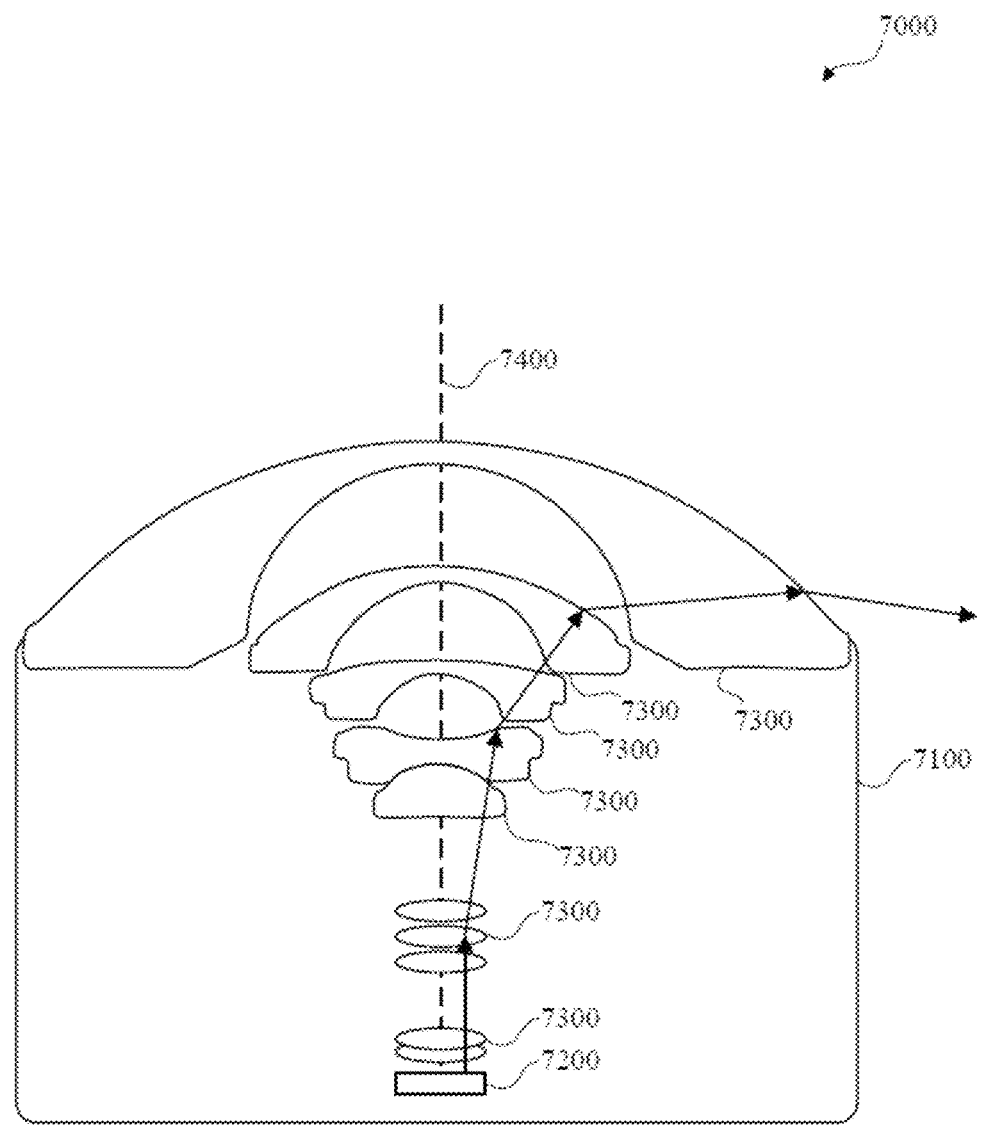
FIG. 7 shows a diagram of an example of a hemispherical fisheye non-visible light flood projection unit in accordance with this disclosure.

FIG. 7 shows a diagram of an example of a hemispherical fisheye non-visible light flood projection unit 7000 in accordance with this disclosure. A fisheye non-visible light depth detection device, such as the hemispherical fisheye non-visible light depth detection device 3000 shown in FIG. 3, or the hemispherical fisheye non-visible light depth detection device 4000 shown in FIG. 4, may include the hemispherical fisheye non-visible light flood projection unit 7000. For example, the hemispherical fisheye non-visible light flood projection unit 4400 of the hemispherical fisheye non-visible light depth detection device 4000 shown in FIG. 4 may be implemented as the hemispherical fisheye non-visible light flood projection unit 7000.

The hemispherical fisheye non-visible light flood projection unit 7000 includes an enclosure 7100, a non-visible light source 7200, and one or more lenses 7300. The hemispherical fisheye non-visible light flood projection unit 7000 has an optical axis, as indicated by the broken line at 7400. An indication of an example light path is indicated by the directional lines extending from the non-visible light source 7200 and passing through and extending from the lenses 7300.

Figure 8:
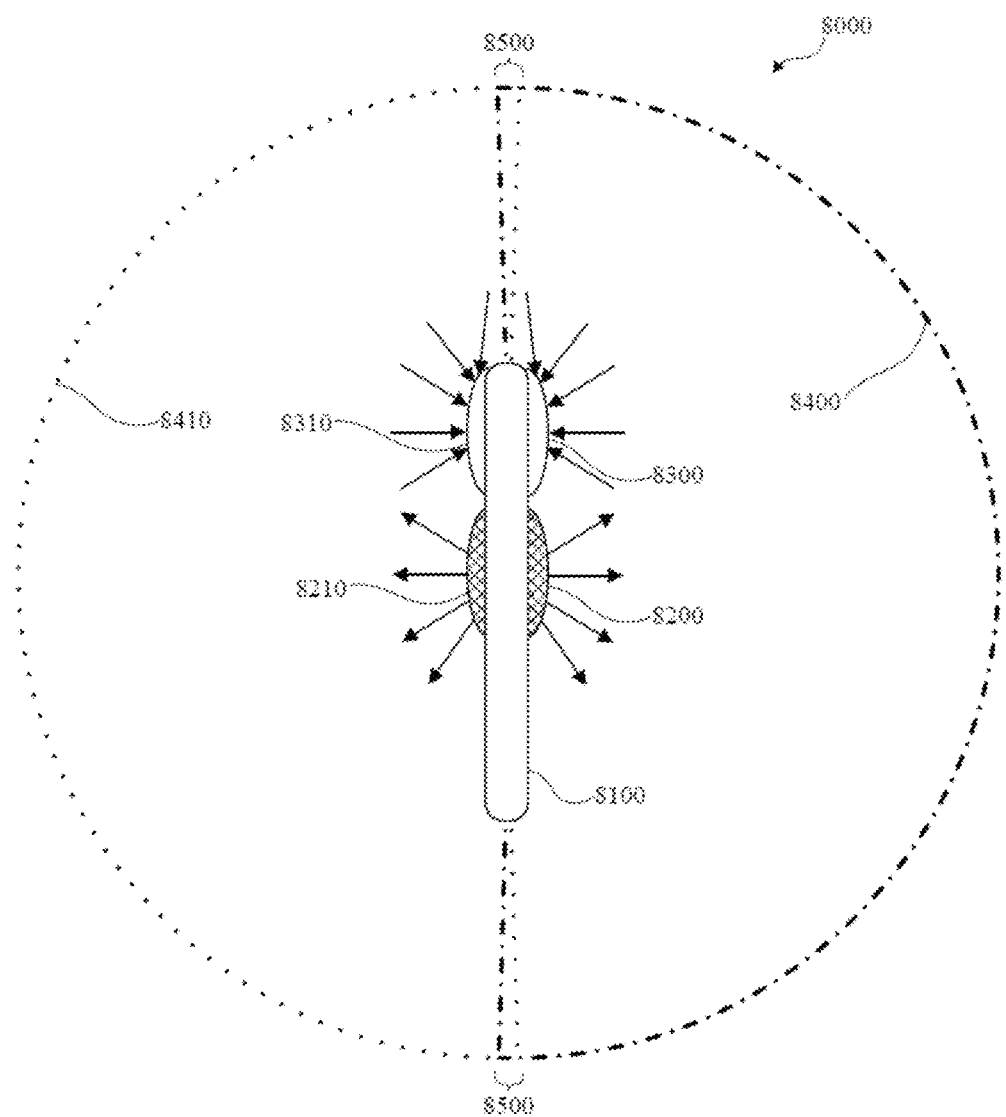
FIG. 8 shows a diagram of an example of a spherical fisheye non-visible light depth detection device in accordance with this disclosure.

FIG. 8 shows a diagram of an example of a spherical fisheye non-visible light depth detection device 8000 in accordance with this disclosure. The spherical fisheye non-visible light depth detection device 8000, or fisheye depth camera, may be similar to the hemispherical fisheye non-visible light depth detection device 3000 shown in FIG. 3, except as described herein or otherwise clear from context. The spherical fisheye non-visible light depth detection device 8000 may be a dual-fisheye camera, which is an omnidirectional camera, and which may capture panoramic or spherical images. The spherical fisheye non-visible light depth detection device 8000 may be a depth camera, which may capture or determine depth information of a captured scene.

The spherical fisheye non-visible light depth detection device 8000 includes a device housing 8100, a first hemispherical fisheye non-visible light projection unit 8200, a second hemispherical fisheye non-visible light projection unit 8210, a first hemispherical fisheye non-visible light detection unit 8300, and a second hemispherical fisheye non-visible light detection unit 8310.

Figure 10:
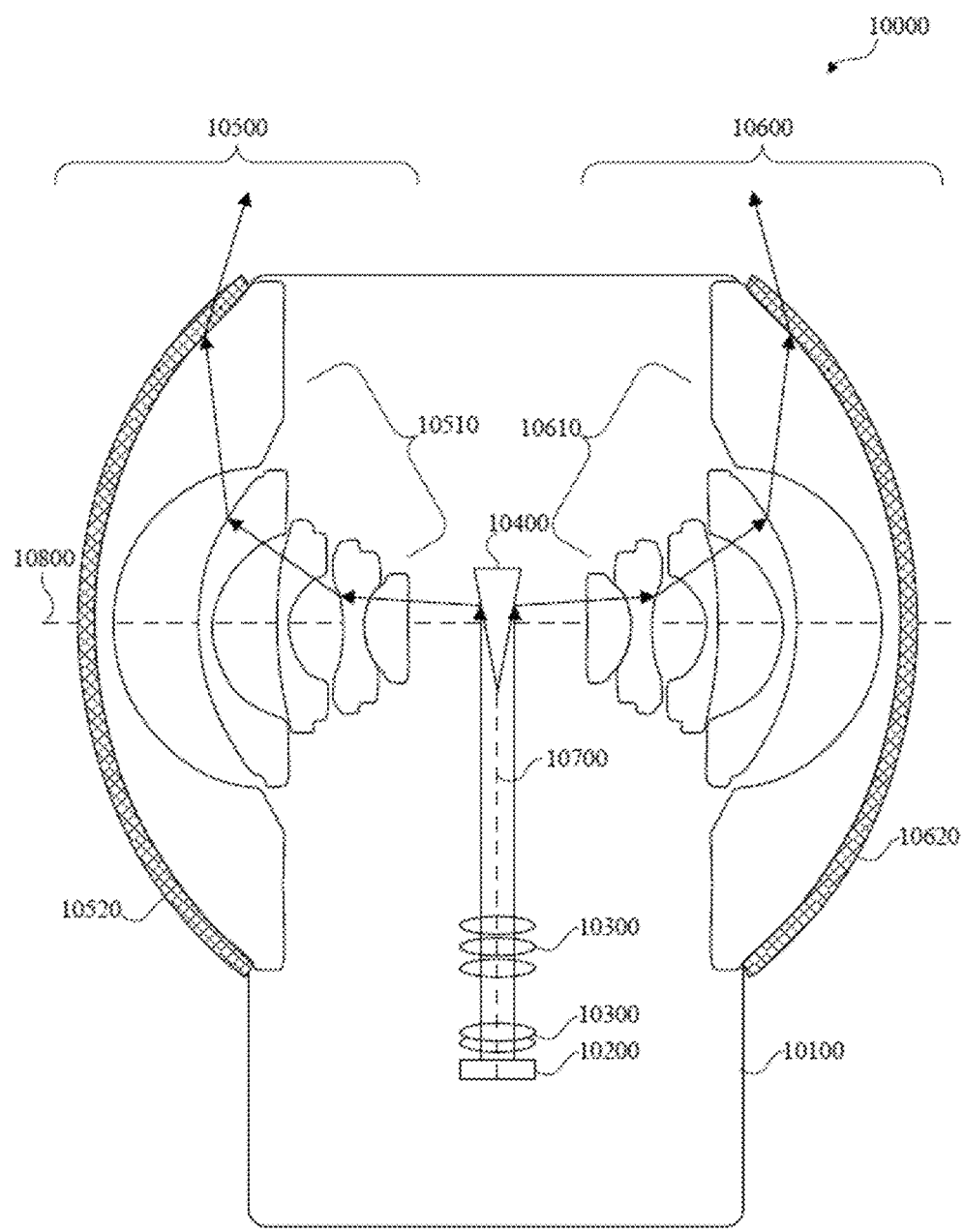
FIG. 10 shows a diagram of an example of a spherical fisheye non-visible light projection unit in accordance with this disclosure.

In some embodiments, the first hemispherical fisheye non-visible light projection unit 8200 may be a first portion of a spherical fisheye non-visible light projection unit and the second hemispherical fisheye non-visible light projection unit 8210 may be a second portion of the spherical fisheye non-visible light projection unit. An example of a spherical fisheye non-visible light projection unit is shown in FIG. 10.

Figure 11:
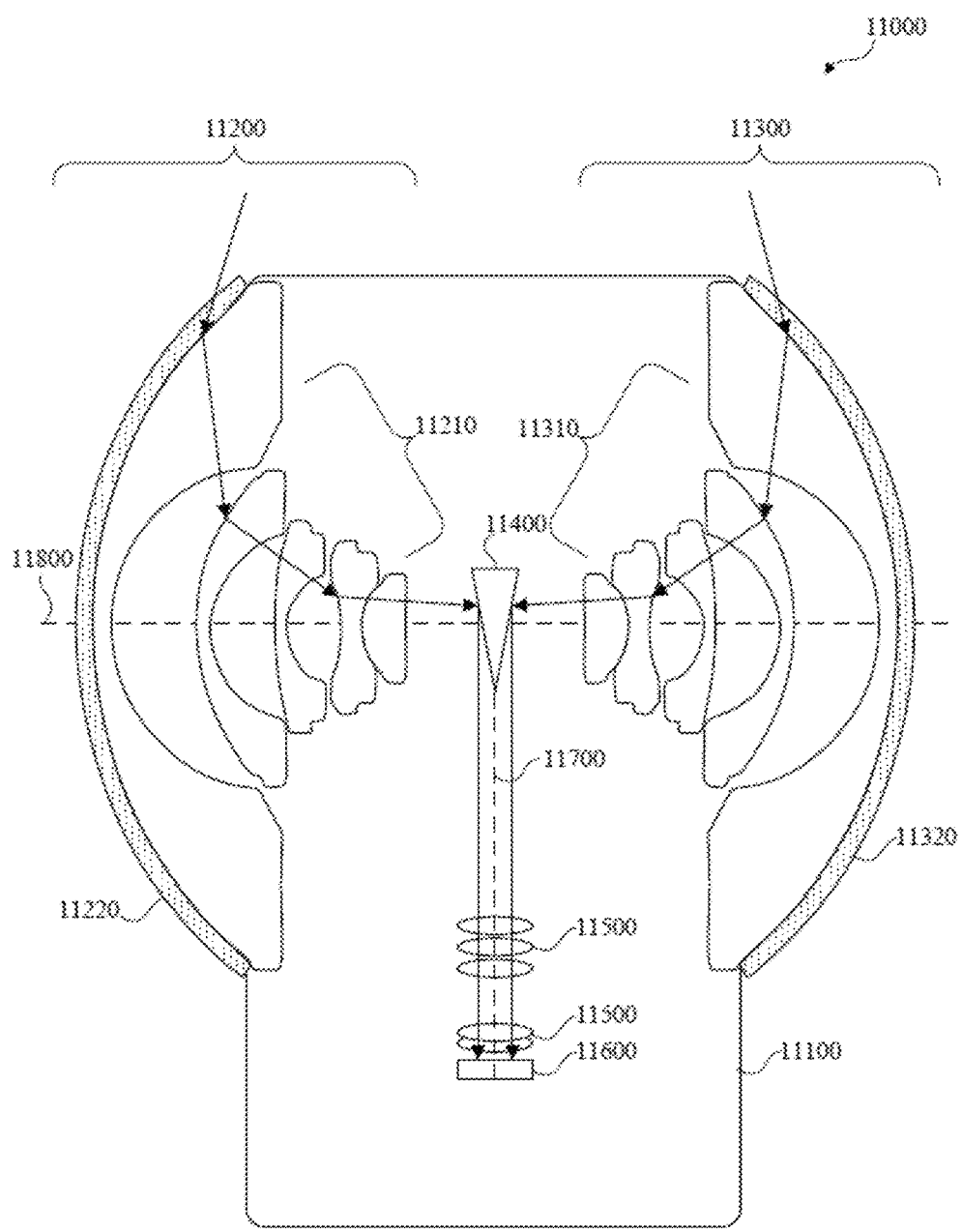
FIG. 11 shows a diagram of an example of a spherical fisheye non-visible light detection unit in accordance with this disclosure.

In some embodiments, the first hemispherical fisheye non-visible light detection unit 8300 may be a first portion of a spherical fisheye non-visible light detection unit and the second hemispherical fisheye non-visible light detection unit 8310 may be a second portion of the spherical fisheye non-visible light detection unit. An example of a spherical fisheye non-visible light detection unit is shown in FIG. 11.

The first hemispherical fisheye non-visible light projection unit 8200 may be similar to the hemispherical fisheye non-visible light projection unit 3200 shown in FIG. 3, except as described herein or otherwise clear from context. The second hemispherical fisheye non-visible light projection unit 8210 may be similar to the hemispherical fisheye non-visible light projection unit 3200 shown in FIG. 3, except as described herein or otherwise clear from context.

The field of projection of the first hemispherical fisheye non-visible light projection unit 8200 is indicated by the dot-dash line arc at 8400. The field of projection of the second hemispherical fisheye non-visible light projection unit 8210 is indicated by the dotted line arc at 8410. The field of projection of the first hemispherical fisheye non-visible light projection unit 8200 may partially overlap the field of projection of the second hemispherical fisheye non-visible light projection unit 8210 to form a combined field of projection that is a 360-degree omnidirectional field of projection. The first hemispherical fisheye non-visible light projection unit 8200 and the second hemispherical fisheye non-visible light projection unit 8210 may collectively project or emit a 360-degree omnidirectional static dot cloud pattern.

In some embodiments, a portion of the hemispherical portion of the omnidirectional static dot cloud pattern projected by the first hemispherical fisheye non-visible light projection unit 8200 may overlap with a portion of the hemispherical portion of the omnidirectional static dot cloud pattern projected by the second hemispherical fisheye non-visible light projection unit 8210 as indicated at 8500. To avoid ambiguity or conflict between the respective projected static dot cloud patterns in the overlapping portions the hemispherical portion of the omnidirectional static dot cloud pattern projected by the first hemispherical fisheye non-visible light projection unit 8200 may differ from the hemispherical portion of the omnidirectional static dot cloud pattern projected by the second hemispherical fisheye non-visible light projection unit 8210. For example, the hemispherical portion of the omnidirectional static dot cloud pattern projected by the first hemispherical fisheye non-visible light projection unit 8200 may use circular dots of non-visible light and the hemispherical portion of the omnidirectional static dot cloud pattern projected by the second hemispherical fisheye non-visible light projection unit 8210 may use square dots of non-visible light. In another example, the light projection by the respective hemispherical fisheye non-visible light projection units 8200, 8210 may be time duplex multiplexed. Other multiplexing techniques may be used.

The field of view of the first hemispherical fisheye non-visible light detection unit 8300 may partially overlap the field of view of the second hemispherical fisheye non-visible light detection unit 8310 to form a combined field of view that is a 360-degree omnidirectional field of view. The first hemispherical fisheye non-visible light detection unit 8300 and the second hemispherical fisheye non-visible light detection unit 8310 may collectively receive or detect reflected light corresponding to a 360-degree omnidirectional static dot cloud pattern, such as the 360-degree omnidirectional static dot cloud pattern projected by the first hemispherical fisheye non-visible light projection unit 8200 and the second hemispherical fisheye non-visible light projection unit 8210.

Figure 9:
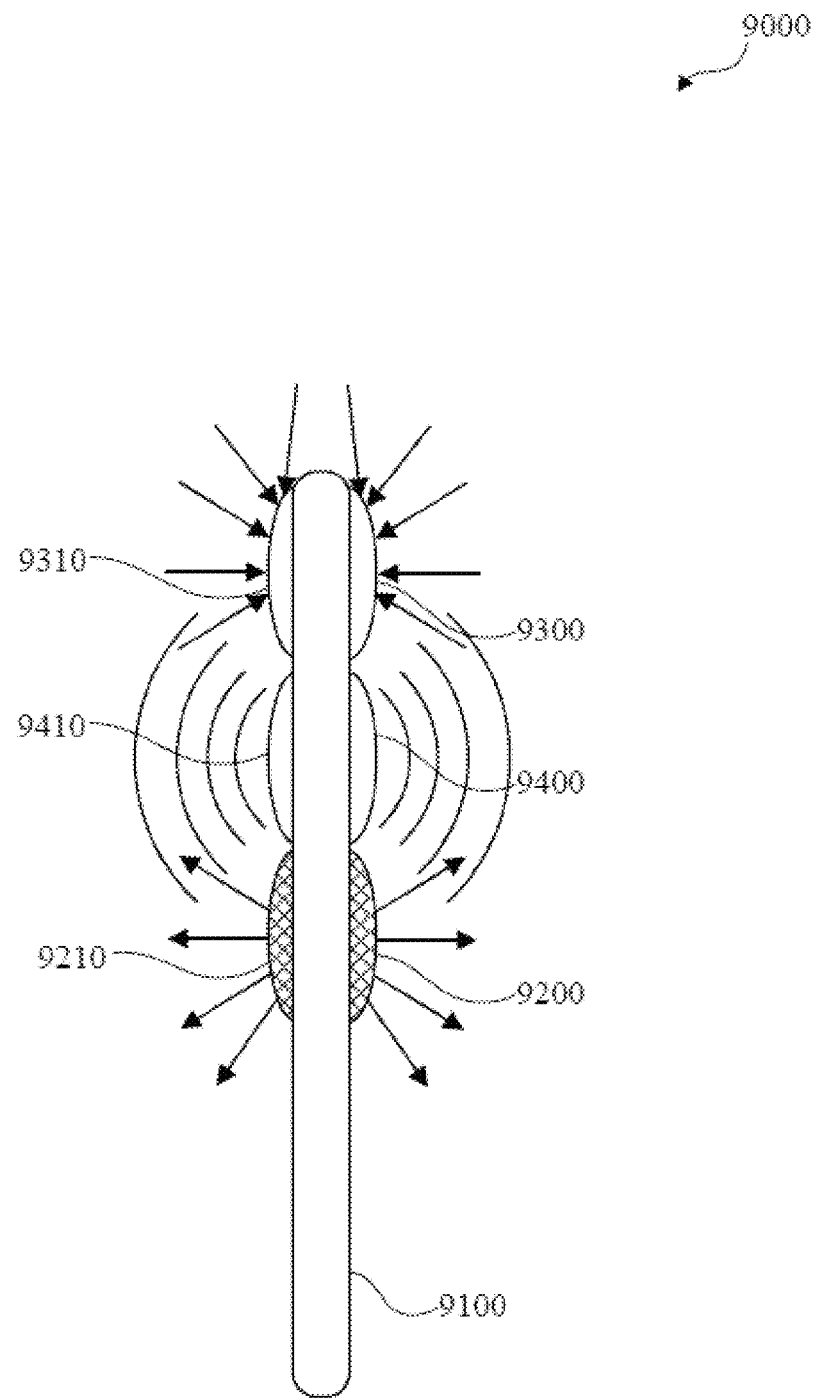
FIG. 9 shows a diagram of another example of a spherical fisheye non-visible light depth detection device in accordance with this disclosure.

FIG. 9 shows a diagram of another example of a spherical fisheye non-visible light depth detection device 9000 in accordance with this disclosure. The spherical fisheye non-visible light depth detection device 9000, may be similar to the spherical fisheye non-visible light depth detection device 9000 shown in FIG. 9, except as described herein or otherwise clear from context.

The spherical fisheye non-visible light depth detection device 9000 includes a device housing 9100, a first hemispherical fisheye non-visible light projection unit 9200, a second hemispherical fisheye non-visible light projection unit 9210, a first hemispherical fisheye non-visible light detection unit 9300, a second hemispherical fisheye non-visible light detection unit 9310, a first hemispherical fisheye non-visible light flood projection unit 9400, and a first hemispherical fisheye non-visible light flood projection unit 9410.

FIG. 10 shows a diagram of an example of a spherical fisheye non-visible light projection unit 10000 in accordance with this disclosure. A spherical, or omnidirectional, fisheye non-visible light depth detection device, such as the spherical fisheye non-visible light depth detection device 8000 shown in FIG. 8, or the spherical fisheye non-visible light depth detection device 9000 shown in FIG. 9, may include the spherical fisheye non-visible light projection unit 10000. For example, the first hemispherical fisheye non-visible light projection unit 8200 and the second hemispherical fisheye non-visible light projection unit 8210 of the spherical fisheye non-visible light depth detection device 8000 shown in FIG. 8 may be implemented as the spherical fisheye non-visible light projection unit 10000.

The spherical fisheye non-visible light projection unit 10000 includes an enclosure 10100, a non-visible light source 10200, one or more first lenses 10300, a mirror 10400, a first hemispherical portion 10500, and a second hemispherical portion 10600. The non-visible light source 10200 and the first lenses 10300 are oriented along a first axis 10700.

The first hemispherical portion 10500 includes one or more second lenses 10510 and a first diffractive optical element 10520. The second hemispherical portion 10600 includes one or more third lenses 10610 and a second diffractive optical element 10620. The first hemispherical portion 10500 and the second hemispherical portion 10600 are oriented along an optical axis, as indicated by the broken line at 10800.

The non-visible light projected by the non-visible light source 10200 along the first axis 10700 is directed, such as split and reflected, by the mirror 10400 toward the first hemispherical portion 10500 and second hemispherical portion 10600 respectively. The non-visible light emitted by the non-visible light source 10200 and directed by the mirror 10400 toward the first hemispherical portion 10500 and second hemispherical portion 10600 respectively is refracted by the lenses 10510, 10610 respectively to form a combined field of projection of 360 degrees longitudinally and 360 degrees laterally. The non-visible light forming the field of projection is rectified to form static dot cloud pattern by the respective diffractive optical elements 10520, 10620. Respective example light paths are indicated by the directional lines extending from the non-visible light source 10200, passing through the lenses 10300, directed by the mirror 10400, passing through the lenses 10510, 10610, and passing through and extending from the diffractive optical elements 10520, 10620.

The non-visible light source 10200 generates the non-visible light in a plane and the combination of the lenses 10300, 10510, 10610, the mirror 10400, and the diffractive optical elements 10520, 10620 maps the light emitted by non-visible light source 10200 to the spherically distributed static dot cloud pattern.

FIG. 11 shows a diagram of an example of a spherical fisheye non-visible light detection unit 11000 in accordance with this disclosure. A spherical, or omnidirectional, fisheye non-visible light depth detection device, such as the spherical fisheye non-visible light depth detection device 8000 shown in FIG. 8, or the spherical fisheye non-visible light depth detection device 9000 shown in FIG. 9, may include the spherical fisheye non-visible light detection unit 11000. For example, the first hemispherical fisheye non-visible light detection unit 8300 and the second hemispherical fisheye non-visible light detection unit 8310 of the spherical fisheye non-visible light depth detection device 8000 shown in FIG. 8 may be implemented as the spherical fisheye non-visible light detection unit 11000.

The spherical fisheye non-visible light detection unit 11000 includes an enclosure 11100, a first hemispherical portion 11200, a second hemispherical portion 11300, a mirror 11400, one or more first lenses 11500, and a non-visible light receiver 11600. The non-visible light receiver 11600 and the first lenses 11500 are oriented along a first axis 11700.

The first hemispherical portion 11200 includes one or more second lenses 11210 and a first non-visible light pass filter 11220. The second hemispherical portion 11300 includes one or more third lenses 11310 and a second non-visible light pass filter 11320. The first hemispherical portion 11200 and the second hemispherical portion 11300 are oriented along an optical axis, as indicated by the broken line at 11800.

The non-visible light pass filters 11220, 11320 may receive light, which may include non-visible light, such as infrared light. For example, the non-visible light pass filters 11220, 11320 may receive infrared light from a static dot cloud pattern reflected by proximate external objects (not shown) subsequent to emission from a non-visible light projection unit, such as the spherical fisheye non-visible light projection unit 10000 shown in FIG. 10.

The light received by the non-visible light pass filters 11220, 11320 is filtered by the non-visible light pass filters 11220, 11320 to exclude visible light and pass through non-visible light. The non-visible light passed through the non-visible light pass filters 11220, 11320 is focused by the second and third lenses 11210, 11310 respectively on the mirror 11400 and directed to the non-visible light receiver 11600 via the first lenses 11500. The combination of the non-visible light pass filters 11220, 11320, the mirror 11400, and the lenses 11210, 11310, 11500 maps the spherical field of view of the spherical fisheye non-visible light detection unit 11000 to the plane of the non-visible light receiver 11600.

Figure 12:
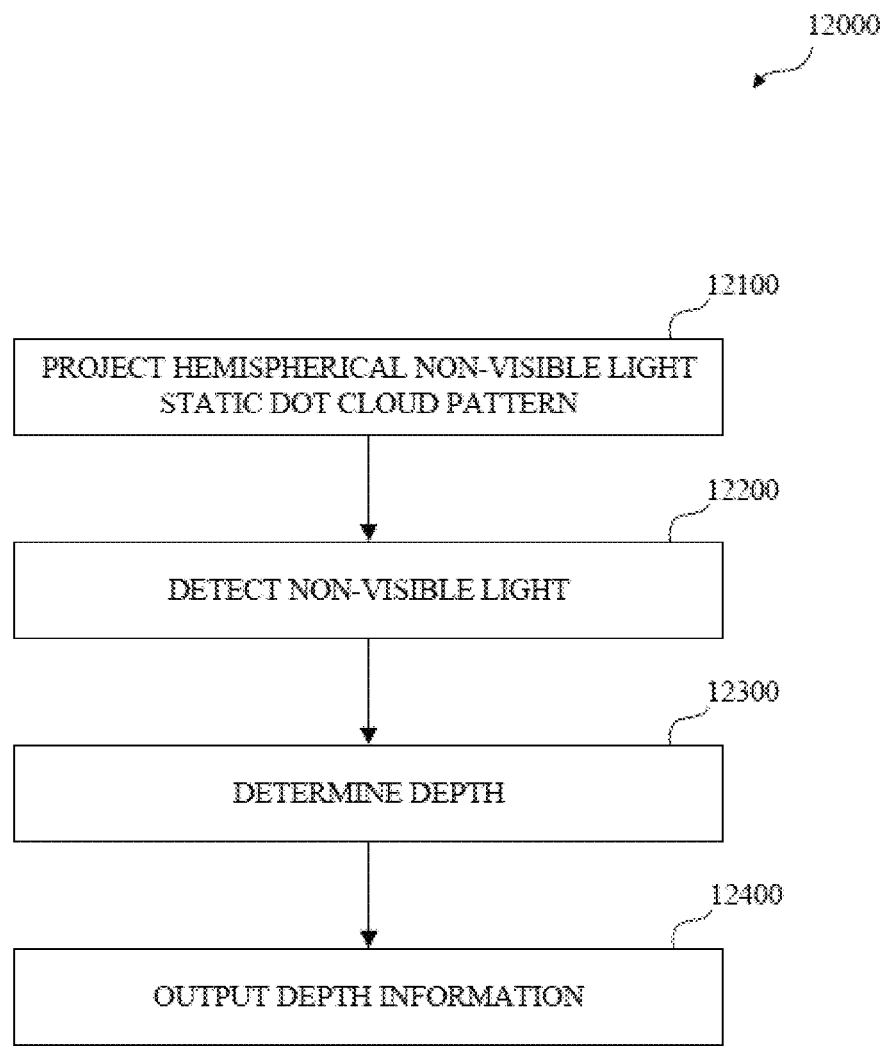
FIG. 12 shows a diagram of an example of fisheye non-visible light depth detection in accordance with this disclosure.

FIG. 12 shows a diagram of an example of fisheye non-visible light depth detection 12000 in accordance with this disclosure. Fisheye non-visible light depth detection 12000 may be implemented in a non-visible light based depth detection device, such as a user device, such as the hemispherical fisheye non-visible light depth detection device 3000 shown in FIG. 3, the hemispherical fisheye non-visible light depth detection device 4000 shown in FIG. 4, the spherical fisheye non-visible light depth detection device 8000 shown in FIG. 8, or the spherical fisheye non-visible light depth detection device 9000 shown in FIG. 9.

Fisheye non-visible light depth detection 12000 includes projecting a hemispherical or spherical non-visible light static dot cloud pattern at 12100, detecting non-visible light at 12200, determining three-dimensional depth information at 12300, and outputting the three-dimensional depth information at 12400.

Projecting the hemispherical or spherical non-visible light static dot cloud pattern at 12100 includes emitting, from a non-visible light source, such as the non-visible light source 5200 shown in FIG. 5 or the non-visible light source 10200 shown in FIG. 10, non-visible light, such as infrared light. In some embodiments, such as in spherical embodiments, projecting the hemispherical or spherical non-visible light static dot cloud pattern at 12100 includes directing, such as by a mirror, such as the mirror 10400 shown in FIG. 10, the emitted non-visible light towards a first hemispherical portion of the non-visible light based depth detection device, such as the first hemispherical portion 10500 shown in FIG. 10, and a second hemispherical portion of the non-visible light based depth detection device, such as the second hemispherical portion 10600 shown in FIG. 10. Projecting the hemispherical or spherical non-visible light static dot cloud pattern at 12100 includes refracting, such as by one or more lenses, such as the lenses 5300 shown in FIG. 5 or the lenses 10300, 10510, 10610 shown in FIG. 6, the emitted non-visible light to form a hemispherical or spherical field of projection. Projecting the hemispherical or spherical non-visible light static dot cloud pattern at 12100 includes rectifying or filtering, such as by a diffractive optical element, such as the diffractive optical element 5400 shown in FIG. 5 or the diffractive optical elements 10520, 10620 shown in FIG. 6, the non-visible light in the hemispherical or spherical field of projection to form the projected hemispherical or spherical non-visible light static dot cloud pattern.

The points of non-visible light of the projected hemispherical or spherical non-visible light static dot cloud pattern, or a portion thereof, may be reflected toward the non-visible light based depth detection device by one or more external objects, or portions thereof, in the environment of the non-visible light based depth detection device.

Detecting the non-visible light at 12200 includes receiving light, including reflected non-visible light that was projected at 12100. Detecting the non-visible light at 12200 includes filtering the received light, such as by a non-visible light pass filter, such as the non-visible light pass filter 6200 shown in FIG. 6 or the non-visible light pass filters 11220, 111320 shown in FIG. 11, to exclude light other than the non-visible light, such as visible light, and pass through the non-visible light. Detecting non-visible light at 12200 includes focusing the received non-visible light onto a planar surface of a non-visible light detector, such as the non-visible light receiver 6400 shown in FIG. 6 or the non-visible light receiver 11600 shown in FIG. 11, using one or more lenses, such as the lenses 6300 shown in FIG. 6 or the lenses 11210, 11310, 11500 shown in FIG. 11. In some embodiments, such as in spherical embodiments, the receive light may be received and filtered by a first hemispherical portion of the non-visible light based depth detection device, such as the first hemispherical portion 11200 shown in FIG. 11, and a second hemispherical portion of the non-visible light based depth detection device, such as the second hemispherical portion 11300 shown in FIG. 11, focused by the respective hemispherical portions on a mirror, such as the mirror 11400 shown in FIG. 11, and directed by the mirror to the non-visible light receiver.

Determining the three-dimensional depth information at 12300 may include determining respective results using one or more mapping functions, wherein θ indicates an angle in radians between a point of reflected light and the optical axis of the camera, f indicates the focal length of the lens, and R indicates the radial position of a corresponding detected light on the sensor, such as an equidistant mapping function, which may be expressed as R=f·θ, a stereographic mapping function, which may be expressed as $$R = 2f \cdot \tan\left(\frac{\theta}{2}\right),$$

an orthographic mapping function, which may be expressed as R=f·sin(θ), an equisolid mapping function, which may be expressed as $$R = 2f \cdot \sin\left(\frac{\theta}{2}\right),$$

or any other hemispherical or spherical mapping function.

Although fisheye non-visible light depth detection is described in the context of structure-light based fisheye non-visible light depth detection herein, other fisheye non-visible light depth detection techniques, such as dynamic pattern structured-light depth detection and time-of-flight (ToF) depth detection may be used. In some implementations, the structured or dynamic light pattern may be a dot cloud pattern, gray/color coded light striping pattern, or the like.

For example, fisheye non-visible light time-of-flight depth detection may include projecting hemispherical non-visible light using a hemispherical fisheye non-visible light flood projection unit, such as the hemispherical fisheye non-visible light flood projection unit 4400 shown in FIG. 4 or the hemispherical fisheye non-visible light flood projection unit 7000 shown in FIG. 7, or projecting spherical non-visible light using a spherical fisheye non-visible light flood projection unit, identifying a temporal projection point corresponding to projecting the non-visible light, receiving reflected non-visible light using a hemispherical fisheye non-visible light detection unit, such as the hemispherical fisheye non-visible light detection unit 6000 shown in FIG. 6, or a spherical fisheye non-visible light detection unit, such as the spherical fisheye non-visible light detection unit 11000 shown in FIG. 11, determining one or more temporal reception points corresponding to receiving the reflected non-visible light, and determining the depth information based on differences between the temporal projection point and the temporal reception points. Spatial information corresponding to detecting or receiving the reflected non-visible light may be mapped to the operational environment of the fisheye non-visible light time-of-flight depth detection unit, and the difference between the temporal projection point and the temporal reception point corresponding to a respective spatial location may be identified as depth information for the corresponding spatial point.

The three-dimensional depth information may be output at 12400. For example, the three-dimensional depth information may be stored in a data storage unit. In another example, the three-dimensional depth information may be transmitted to another component of the apparatus.

Figure 13:
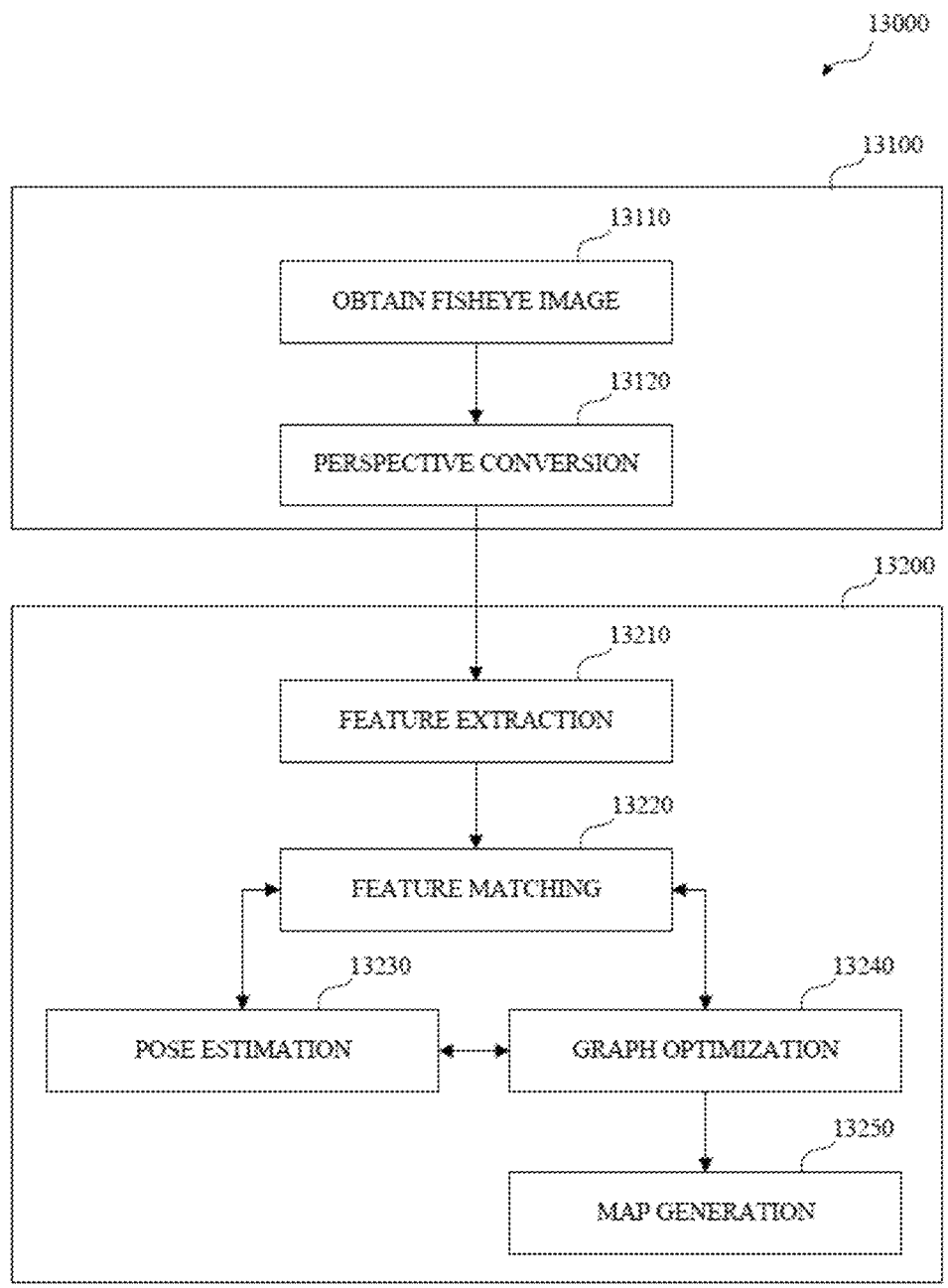
FIG. 13 is a diagram of an example of three-dimensional modeling using hemispherical or spherical visible light-depth images in accordance with this disclosure.

FIG. 13 is a diagram of an example of three-dimensional modeling using hemispherical or spherical visible light-depth images 13000 in accordance with this disclosure. Three-dimensional modeling using hemispherical or spherical visible light-depth images 13000 may be implemented in a non-visible light based depth detection device, such as a user device, such as the hemispherical fisheye non-visible light depth detection device 3000 shown in FIG. 3, the hemispherical fisheye non-visible light depth detection device 4000 shown in FIG. 4, the spherical fisheye non-visible light depth detection device 8000 shown in FIG. 8, or the spherical fisheye non-visible light depth detection device 9000 shown in FIG. 9.

Three-dimensional modeling using hemispherical or spherical visible light-depth images 13000 may include generating a map or model representing the operational environment of the user device, or a portion thereof, in three dimensions, such as a three-dimensional augmented reality model or a three-dimensional virtual reality model. Three-dimensional modeling using hemispherical or spherical visible light-depth images 13000 includes image acquisition and pre-processing at 13100 and three-dimensional modeling at 13200.

Image acquisition and pre-processing at 13100 includes obtaining images at 13110 and perspective conversion at 13120. Obtaining images at 13110 may include obtaining a hemispherical or spherical visual light image, or images, including depth information, such as an RGB-D (Red-Green-Blue-Depth) image. For simplicity and clarity, a hemispherical or spherical visual light image including depth information, such as a combination of a hemispherical or spherical visual light image and a hemispherical or spherical non-visual light depth image may be referred to herein as a hemispherical or spherical visible light-depth (VL-D) image. The hemispherical or spherical visual light image and the hemispherical or spherical non-visual light depth image may be spatiotemporally concurrent.

A hemispherical VL-D image may include a hemispherical visible light image and a hemispherical depth image. For example, the user device may include a hemispherical image capture apparatus, which may be similar to the hemispherical fisheye non-visible light depth detection device 3000 shown in FIG. 3 or the hemispherical fisheye non-visible light depth detection device 4000 shown in FIG. 4, except as described herein or otherwise clear from context. The hemispherical image capture apparatus may include a hemispherical, such as fisheye, visible light image capture unit. The hemispherical visible light image capture unit may be similar to the hemispherical fisheye non-visible light detection unit 6000 shown in FIG. 6 except as described herein or otherwise clear from context. For example, the hemispherical visible light image capture unit may omit the non-visible light pass filter 6200 shown in FIG. 6 and may be otherwise configured to capture visible light. The hemispherical image capture apparatus may include a hemispherical non-visible light depth detection unit, device, or array, such as the hemispherical fisheye non-visible light depth detection device 3000 shown in FIG. 3 or the hemispherical fisheye non-visible light depth detection device 4000 shown in FIG. 4. The hemispherical non-visible light depth detection unit, device, or array and the hemispherical visible light image capture unit may be synchronized. The hemispherical visible light image capture unit may obtain, or capture, a hemispherical visual light image and concurrently the hemispherical non-visible light depth detection unit may obtain, or capture, a corresponding hemispherical non-visible light depth image.

A spherical VL-D image may include a spherical visible light image and a spherical depth image. For example, the user device may include a spherical image capture apparatus, which may be similar to the spherical fisheye non-visible light depth detection device 8000 shown in FIG. 8 or the spherical fisheye non-visible light depth detection device 9000 shown in FIG. 9, except as described herein or otherwise clear from context. The spherical image capture apparatus may include a spherical visible light image capture unit. The spherical visible light image capture unit may be similar to the hemispherical fisheye non-visible light detection unit 11000 shown in FIG. 11 except as described herein or otherwise clear from context. For example, the spherical visible light image capture unit may omit the non-visible light pass filters 11220, 11320 shown in FIG. 11 and may be otherwise configured to capture visible light. The spherical image capture apparatus may include a spherical non-visible light depth detection unit, device, or array, such as the spherical fisheye non-visible light depth detection device 8000 shown in FIG. 8 or the spherical fisheye non-visible light depth detection device 9000 shown in FIG. 9. The spherical non-visible light depth detection unit, device, or array and the spherical visible light image capture unit may be synchronized. The spherical visible light image capture unit may obtain, or capture, a spherical visual light image and concurrently the spherical non-visible light depth detection unit may obtain, or capture, a corresponding spherical non-visible light depth image.

Perspective conversion at 13120 may include generating perspective converted images, such as perspective converted visual light images, perspective converted depth images, both, or a combination thereof, which may be perspective projection images. For example, a perspective conversion unit of the user device may receive the hemispherical or spherical VL-D image from the hemispherical or spherical image capture unit, or units, of the user device, may generate perspective converted images based on the hemispherical or spherical VL-D image, and may output the perspective converted images. For example, a perspective converted hemispherical VL-D image generated based on a hemispherical VL-D image may be similar to a panoramic visible light image and a corresponding panoramic non-visible light depth image. Perspective conversion at 13120 may include mapping each pixel location in the perspective converted hemispherical or spherical VL-D image to a corresponding location in the hemispherical or spherical VL-D. Perspective conversion at 13120 may include image processing, such as anti-aliasing for the visible light image, the depth image, or both. The perspective conversion unit may output a perspective converted hemispherical or spherical VL-D image, which may include a perspective converted hemispherical or spherical visible light image and a perspective converted hemispherical or spherical non-visible light depth image.

Perspective conversion at 13120 may include, for example, spherical perspective projection, which may include projecting lines in space into curves in a spherical perspective image in accordance with a straight-line spherical perspective projection constraint. For example, lines in space may be projected into an ellipse curve in the image plane having a half long axis. Perspective conversion at 13120 may include identifying the ellipse corresponding to the line in space and determining a center (optical center) and the half long axis for the ellipse curve, which may be based on identifying points $(u_i, v_i)$, such as five points $(i=1, \ldots, 5)$, along the ellipse curve from the VL-D image.

Perspective conversion at 13120 may include curve fitting the points $(u_i, v_i)$, such as using a least squares cost function, which may include identifying coefficients (b, c, d, e, f), and which may be expressed as the following:

$$u^2+buv+cv^2+du+ev+f=0.$$

Perspective conversion at 13120 may include center point $(x_c, y_c)$, which may be the optical center of the hemispherical image, and half long axis (a), which may correspond to the radius, determination for the ellipse. For each point, such as each pixel, (x,y) in the perspective converted image, a corresponding location (u,v) in the VL-D image may be identified and a value for the respective point (x,y) in the perspective converted image may be determined, such as using bilinear interpolation based on the values from the corresponding location (u,v) in the VL-D image.

Perspective conversion at 13120 may include using intrinsic parameter, extrinsic parameters, or both, which may be obtained using a calibration process. The intrinsic parameters may correspond with lens distortion. The extrinsic parameters may correspond with a transformation between a coordinate system of the hemispherical or spherical visual light image and a coordinate system of the hemispherical or spherical non-visual light depth image. Perspective conversion at 13120 may include aligning the perspective converted hemispherical or spherical visible light image with the corresponding perspective converted hemispherical or spherical non-visible light depth image.

Three-dimensional modeling at 13200 may generate a three-dimensional model of the operational environment of the user device corresponding to the VL-D images captured at 13100. For example, a three-dimensional modeling unit of the user device may receive the perspective converted hemispherical or spherical VL-D image from the hemispherical or spherical image capture apparatus and may generate the three-dimensional model based on the received perspective converted hemispherical or spherical VL-D image such using simultaneous localization and mapping (SLAM). Three-dimensional modeling at 13200 includes feature extraction at 13210, feature matching at 13220, pose estimation at 13230, graph optimization at 13240, and map generation at 13250. Although not shown separately in FIG. 13, three-dimensional modeling at 13200 may include outputting, such as transmitting or storing, the three-dimensional model, the perspective converted hemispherical or spherical VL-D images, or a combination thereof. In some implementations, perspective conversion at 13120 may be omitted and three-dimensional modeling at 13200 may be based on the hemispherical or spherical VL-D image, or image sequence, captured at 13100.

Feature extraction at 13210 may include performing feature extraction, such as scale-invariant feature transform (SIFT) based feature extraction, histogram of oriented gradients (HOG) based feature extraction, speeded up robust features (SURF) based feature extraction, neural network-based feature extraction, or the like, based on the perspective converted hemispherical or spherical VL-D image. One or more features, which may correspond with portions of objects, such as object corners or edges, captured in the respective image, may be identified in the perspective converted hemispherical or spherical VL-D image. For example, one or more features may be identified in the perspective converted hemispherical or spherical visible light image and one or more features may be identified in the corresponding perspective converted hemispherical or spherical non-visible light depth image. In some embodiments, a temporal sequence of VL-D images may be captured and feature extraction at 13210 may include identifying or extracting features from two or more VL-D images from the temporal sequence of VL-D images.

In some embodiments, a temporal sequence of VL-D images may be captured and feature matching at 13220 may include identifying correspondences between features identified or extracted at 13210 from a first VL-D image from the temporal sequence of VL-D images and features identified or extracted at 13210 from a second, such as subsequent, VL-D image from the temporal sequence of VL-D images, which may include aligning the first VL-D image with the second VL-D image.

Pose estimation at 13230 may include identifying an orientation of the user device (camera) with respect to the operating environment or scene captured by the VL-D image or images, which may be based on the features extracted at 13210 and matched at 13220.

Graph optimization at 13240 may include generating, optimizing, or both, a pose graph based on the pose estimation at 13230. For example, a temporal sequence of VL-D images may be captured and pose estimation at 13230 may include relative orientation, or pose, of the user device (camera) with respect to the captured scene between respective VL-D images from the sequence of VL-D images. A pose, or relative orientation, may be identified at 13230 for a respective VL-D image, and may be associated with a node in a pose graph at 13240, which may correspond with a respective temporal point or location. Edges, or connections between nodes, in the pose graph may represent constraints between the respective nodes. Graph optimization may include adjusting the relative orientation of the nodes to maximize consistency with the constraints, which may include minimizing the effect of noise.

Map generation at 13250 may include generating a three-dimensional map representing the operational environment based on the VL-D images captured at 13210 and the optimized pose graph generated at 13240. For example, a three-dimensional map representing the operational environment of the camera may be generated based on a single VL-D image, which may omit feature matching at 13220, pose estimation at 13230, graph optimization at 13240, or a combination thereof. In another example, a three-dimensional map of an object may be generated based on two or more VL-D images. In another example, a three-dimensional map representing a complex space, such as a multi-room building, may be generated based on multiple VL-D images.

Aspects, features, elements, and embodiments of methods, procedures, or algorithms disclosed herein, may be implemented in a computer program, software, or firmware incorporated in a computer-readable storage medium for execution by a computer or processor, and may take the form of a computer program product accessible from, such as a tangible computer-usable or computer-readable medium.

As used herein, the terminology "computer" or "computing device" includes any unit, or combination of units, capable of performing any method, or any portion or portions thereof, disclosed herein. As used herein, terminology "user device", "mobile device", or "mobile computing device" includes but is not limited to a user equipment, a wireless transmit/receive unit, a mobile station, a fixed or mobile subscriber unit, a pager, a cellular telephone, a personal digital assistant (PDA), a computer, or any other type of user device capable of operating in a mobile environment.

As used herein, the terminology "processor" includes a single processor or multiple processors, such as one or more special purpose processors, one or more digital signal processors, one or more microprocessors, one or more controllers, one or more microcontrollers, one or more Application Specific Integrated Circuits (ASICs), one or more Application Specific Standard Products (ASSPs); one or more Field Programmable Gate Arrays (FPGAs) circuits, any other type or combination of integrated circuits (ICs), one or more state machines, or any combination thereof.

As used herein, the terminology "memory" includes any computer-usable or computer-readable medium or device that can, for example, tangibly contain, store, communicate, or transport any signal or information for use by or in connection with any processor. Examples of computer-readable storage mediums may include one or more read only memories, one or more random access memories, one or more registers, one or more cache memories, one or more semiconductor memory devices, one or more magnetic media, such as internal hard disks and removable disks, one or more magneto-optical media, one or more optical media such as CD-ROM disks, and digital versatile disks (DVDs), or any combination thereof.

As used herein, the terminology "instructions" may include directions for performing any method, or any portion or portions thereof, disclosed herein, and may be realized in hardware, software, or any combination thereof. For example, instructions may be implemented as information stored in the memory, such as a computer program, that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. Portions of the instructions may be distributed across multiple processors on the same machine or different machines or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

What is claimed is:

1. A method of three-dimensional modeling, the method comprising:
obtaining a hemispherical or spherical visible light-depth image capturing an operational environment of a user device, wherein obtaining the hemispherical or spherical visible light-depth image includes:
obtaining a hemispherical or spherical visual light image; and
obtaining a hemispherical or spherical non-visual light depth image;
generating a perspective converted hemispherical or spherical visible light-depth image, wherein generating the perspective converted hemispherical or spherical visible light-depth image includes:
generating a perspective converted hemispherical or spherical visual light image; and
generating a perspective converted hemispherical or spherical non-visual light depth image;
generating a three-dimensional model of the operational environment based on the perspective converted hemispherical or spherical visible light-depth image; and
outputting the three-dimensional model.

2. The method of claim 1, wherein the hemispherical or spherical visual light image and the hemispherical or spherical non-visual light depth image are spatiotemporally concurrent.

3. The method of claim 1, wherein obtaining the hemispherical or spherical non-visual light depth image includes:
projecting hemispherical or spherical non-visible light;
in response to projecting the hemispherical or spherical non-visible light, detecting reflected non-visible light; and
determining three-dimensional depth information based on the detected reflected non-visible light and the projected hemispherical or spherical non-visible light.

4. The method of claim 3, wherein projecting the hemispherical or spherical non-visible light includes projecting a hemispherical or spherical non-visible light static structured light pattern.

5. The method of claim 4, wherein projecting the hemispherical or spherical non-visible light static structured light pattern includes:
emitting infrared light from an infrared light source;
refracting the emitted infrared light to form a hemispherical or spherical field of projection; and
rectifying the infrared light of the hemispherical or spherical field of projection to form the hemispherical or spherical non-visible light static structured light pattern.

6. The method of claim 1, wherein generating the three-dimensional model includes:
obtaining feature information by performing feature extraction based on the perspective converted hemispherical or spherical visible light-depth image.

7. The method of claim 6, wherein:
obtaining the hemispherical or spherical visible light-depth image includes obtaining a sequence of hemispherical or spherical visible light-depth images, the sequence of hemispherical or spherical visible light-depth images including the hemispherical or spherical visible light-depth image, wherein each hemispherical or spherical visible light-depth image from the sequence of hemispherical or spherical visible light-depth images corresponds to a respective spatiotemporal location in the operational environment; and
generating the perspective converted hemispherical or spherical visible light-depth image includes generating a sequence of perspective converted hemispherical or spherical visible light-depth images, wherein the sequence of perspective converted hemispherical or spherical visible light-depth images includes the perspective converted hemispherical or spherical visible light-depth image, and wherein each respective perspective converted hemispherical or spherical visible light-depth image from the sequence of perspective converted hemispherical or spherical visible light-depth images corresponds with a respective hemispherical or spherical visible light-depth image from the sequence of hemispherical or spherical visible light-depth images.

8. The method of claim 7, wherein obtaining the feature information includes obtaining respective feature information corresponding to each respective perspective converted hemispherical or spherical visible light-depth image from the sequence of perspective converted hemispherical or spherical visible light-depth images.

9. The method of claim 8, wherein generating the three-dimensional model includes:
generating an optimized pose graph based on the respective feature information corresponding to each respective perspective converted hemispherical or spherical visible light-depth image from the sequence of perspective converted hemispherical or spherical visible light-depth images; and
generating the three-dimensional model based on the optimized pose graph and the sequence of perspective converted hemispherical or spherical visible light-depth images.

10. A non-transitory computer-readable storage medium, comprising executable instructions that, when executed by a processor, facilitate performance of operations, comprising:
obtaining a hemispherical or spherical visible light-depth image capturing an operational environment of a user device, wherein obtaining the hemispherical or spherical visible light-depth image includes:
obtaining a hemispherical or spherical visual light image; and
obtaining a hemispherical or spherical non-visual light depth image;
generating a perspective converted hemispherical or spherical visible light-depth image, wherein generating the perspective converted hemispherical or spherical visible light-depth image includes:
generating a perspective converted hemispherical or spherical visual light image; and
generating a perspective converted hemispherical or spherical non-visual light depth image;

generating a three-dimensional model of the operational environment based on the perspective converted hemispherical or spherical visible light-depth image; and outputting the three-dimensional model.

11. The non-transitory computer-readable storage medium of claim 10, wherein the hemispherical or spherical visual light image and the hemispherical or spherical non-visual light depth image are spatiotemporally concurrent.

12. The non-transitory computer-readable storage medium of claim 10, wherein obtaining the hemispherical or spherical non-visual light depth image includes:
projecting hemispherical or spherical non-visible light;
in response to projecting the hemispherical or spherical non-visible light, detecting reflected non-visible light; and
determining three-dimensional depth information based on the detected reflected non-visible light and the projected hemispherical or spherical non-visible light.

13. The non-transitory computer-readable storage medium of claim 12, wherein projecting the hemispherical or spherical non-visible light includes projecting a hemispherical or spherical non-visible light static structured light pattern.

14. The non-transitory computer-readable storage medium of claim 13, wherein projecting the hemispherical or spherical non-visible light static structured light pattern includes:
emitting infrared light from an infrared light source;
refracting the emitted infrared light to form a hemispherical or spherical field of projection; and
rectifying the infrared light of the hemispherical or spherical field of projection to form the hemispherical or spherical non-visible light static structured light pattern.

15. The non-transitory computer-readable storage medium of claim 10, wherein generating the three-dimensional model includes:
obtaining feature information by performing feature extraction based on the perspective converted hemispherical or spherical visible light-depth image.

16. The non-transitory computer-readable storage medium of claim 15, wherein:
obtaining the hemispherical or spherical visible light-depth image includes obtaining a sequence of hemispherical or spherical visible light-depth images, the sequence of hemispherical or spherical visible light-depth images including the hemispherical or spherical visible light-depth image, wherein each hemispherical or spherical visible light-depth image from the sequence of hemispherical or spherical visible light-depth images corresponds to a respective spatiotemporal location in the operational environment; and
generating the perspective converted hemispherical or spherical visible light-depth image includes generating a sequence of perspective converted hemispherical or spherical visible light-depth images, wherein the sequence of perspective converted hemispherical or spherical visible light-depth images includes the perspective converted hemispherical or spherical visible light-depth image, and wherein each respective perspective converted hemispherical or spherical visible light-depth image from the sequence of perspective converted hemispherical or spherical visible light-depth images corresponds with a respective hemispherical or spherical visible light-depth image from the sequence of hemispherical or spherical visible light-depth images.

17. The non-transitory computer-readable storage medium of claim 16, wherein obtaining the feature information includes obtaining respective feature information corresponding to each respective perspective converted hemispherical or spherical visible light-depth image from the sequence of perspective converted hemispherical or spherical visible light-depth images.

18. The non-transitory computer-readable storage medium of claim 17, wherein generating the three-dimensional model includes:
generating an optimized pose graph based on the respective feature information corresponding to each respective perspective converted hemispherical or spherical visible light-depth image from the sequence of perspective converted hemispherical or spherical visible light-depth images; and
generating the three-dimensional model based on the optimized pose graph and the sequence of perspective converted hemispherical or spherical visible light-depth images.

19. An apparatus for use in depth detection, the apparatus comprising:
a hemispherical or spherical non-visible light projector;
a hemispherical or spherical non-visible light sensor;
a hemispherical or spherical visible light sensor;
a non-transitory computer readable medium; and
a processor configured to execute instructions stored on the non-transitory computer readable medium to:
obtain a hemispherical or spherical visible light-depth image capturing an operational environment of the apparatus, wherein obtaining the hemispherical or spherical visible light-depth image includes:
controlling the hemispherical or spherical visible light sensor to obtain a hemispherical or spherical visual light image;
controlling the hemispherical or spherical non-visible light projector to project a hemispherical or spherical non-visible light static structured light pattern;
in response to controlling the hemispherical or spherical non-visible light projector to project the hemispherical or spherical non-visible light static structured light pattern, controlling the hemispherical or spherical non-visible light sensor to obtain a hemispherical or spherical non-visual light depth image;
generate a perspective converted hemispherical or spherical visible light-depth image by:
generating a perspective converted hemispherical or spherical visual light image; and
generating a perspective converted hemispherical or spherical non-visual light depth image;
generate a three-dimensional model of the operational environment based on the perspective converted hemispherical or spherical visible light-depth image; and
output the three-dimensional model.

20. The apparatus of claim 19, wherein the processor is configured to execute instructions stored on the non-transitory computer readable medium to:
obtain the hemispherical or spherical visible light-depth image by obtaining a sequence of hemispherical or spherical visible light-depth images, the sequence of hemispherical or spherical visible light-depth images including the hemispherical or spherical visible light-depth image, wherein each hemispherical or spherical visible light-depth image from the sequence of hemispherical or spherical visible light-depth images corresponds to a respective spatiotemporal location in the operational environment;

generate the perspective converted hemispherical or spherical visible light-depth image by generating a sequence of perspective converted hemispherical or spherical visible light-depth images, wherein the sequence of perspective converted hemispherical or spherical visible light-depth images includes the perspective converted hemispherical or spherical visible light-depth image, and wherein each respective perspective converted hemispherical or spherical visible light-depth image from the sequence of perspective converted hemispherical or spherical visible light-depth images corresponds with a respective hemispherical or spherical visible light-depth image from the sequence of hemispherical or spherical visible light-depth images;

obtain feature information by performing feature extraction based on the perspective converted hemispherical or spherical visible light-depth image, wherein obtaining the feature information includes obtaining respective feature information corresponding to each respective perspective converted hemispherical or spherical visible light-depth image from the sequence of perspective converted hemispherical or spherical visible light-depth images;

generate an optimized pose graph based on the respective feature information corresponding to each respective perspective converted hemispherical or spherical visible light-depth image from the sequence of perspective converted hemispherical or spherical visible light-depth images; and generate the three-dimensional model based on the optimized pose graph and the sequence of perspective converted hemispherical or spherical visible light-depth images.

* * * * *